United States Patent
Kadota et al.

(10) Patent No.: US 12,160,194 B2
(45) Date of Patent: Dec. 3, 2024

(54) REGENERATIVE BRAKING SYSTEM, AND ELECTRICALLY DRIVEN WORK VEHICLE USING THE SAME

(71) Applicant: Hitachi Construction Machinery Co., Ltd., Tokyo (JP)

(72) Inventors: Mitsuhiro Kadota, Tokyo (JP); Yuuichi Kunitomo, Tsuchiura (JP); Atsushi Kitaguchi, Tsuchiura (JP); Takaaki Tanaka, Tsuchiura (JP); Naoki Fukuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 118 days.

(21) Appl. No.: 18/015,236

(22) PCT Filed: May 28, 2021

(86) PCT No.: PCT/JP2021/020556
§ 371 (c)(1),
(2) Date: Jan. 9, 2023

(87) PCT Pub. No.: WO2022/014177
PCT Pub. Date: Jan. 20, 2022

(65) Prior Publication Data
US 2023/0261591 A1 Aug. 17, 2023

(30) Foreign Application Priority Data
Jul. 13, 2020 (JP) .................................. 2020-120231

(51) Int. Cl.
*B60R 16/04* (2006.01)
*B60L 7/12* (2006.01)
(Continued)

(52) U.S. Cl.
CPC .................. *H02P 3/18* (2013.01); *B60L 7/12* (2013.01); *B60L 7/16* (2013.01); *H02J 7/143* (2020.01); *H02P 5/74* (2013.01); *H02P 27/08* (2013.01)

(58) Field of Classification Search
CPC .... H02P 3/18; H02P 5/74; H02P 27/08; B60L 7/12; B60L 7/16; H02J 7/143
See application file for complete search history.

(56) References Cited

U.S. PATENT DOCUMENTS

| 2003/0141123 | A1 | 7/2003 | Sugiura et al. |
| 2010/0051359 | A1* | 3/2010 | Fushiki ................... B60K 6/52 180/68.5 |
| 2020/0180588 | A1 | 6/2020 | Tanaka et al. |

FOREIGN PATENT DOCUMENTS

| JP | 2003-230201 A | 8/2003 |
| JP | 2010-74913 A | 4/2010 |
| JP | 2019-64450 A | 4/2019 |

OTHER PUBLICATIONS

International Search Report (PCT/ISA/210) issued in PCT Application No. PCT/JP2021/020556 dated Jul. 6, 2021 with English translation (five (5) pages).

(Continued)

*Primary Examiner* — Muhammad S Islam
(74) *Attorney, Agent, or Firm* — Crowell & Moring LLP

(57) ABSTRACT

When regeneration operation is being performed, electric power on a main-machine side is supplied to an auxiliary-machine side, a voltage on the auxiliary-machine side is controlled to become a first voltage value predetermined on the basis of operating voltage specifications of an auxiliary apparatus, a generator on the auxiliary-machine side is deactivated to stop supply of electric power to the auxiliary-machine side, and electric power on the auxiliary-machine side is supplied to a power storage apparatus. When the (Continued)

regeneration operation is ended, the supply of the electric power from the main-machine side to the auxiliary-machine side is stopped, the generator on the auxiliary-machine side is activated, the generator on the auxiliary-machine side is controlled such that a voltage on the auxiliary-machine side becomes the first voltage value, electric power of the power storage apparatus is supplied to the auxiliary-machine side, and the voltage on the auxiliary-machine side is controlled to become a second voltage value higher than the first voltage value. This enables reduction of fluctuations of a voltage supplied to auxiliary machines at a time of switching of regeneration operation by travel motors.

3 Claims, 16 Drawing Sheets

(51) Int. Cl.
    *B60L 7/16*     (2006.01)
    *H02J 7/14*     (2006.01)
    *H02P 3/18*     (2006.01)
    *H02P 5/74*     (2006.01)
    *H02P 27/08*     (2006.01)

(56) References Cited

OTHER PUBLICATIONS

Japanese-language Written Opinion (PCT/ISA/237) issued in PCT Application No. PCT/JP2021/020556 dated Jul. 6, 2021 (four (4) pages).
International Preliminary Report on Patentability (PCT/IB/338 & PCT/IB/373) issued in PCT Application No. PCT/JP2021/020556 dated Jan. 26, 2023, Including English translation of document C2 (Japan-language Written Opinion (PCT/ISA/237), filed on Jan. 9, 2023) (six (6) pages).

* cited by examiner

FROM 53

REGENERATIVE BRAKING SYSTEM, AND ELECTRICALLY DRIVEN WORK VEHICLE USING THE SAME

TECHNICAL FIELD

The present invention relates to a regenerative braking system, and an electrically driven work vehicle using the same.

BACKGROUND ART

In recent years, in the context of the depletion of fossil fuels and the worsening situation about global environmental problems, electrically driven vehicles using electrical energy such as hybrid automobiles and electric automobiles are increasingly attracting attention, and also have been put into a practical use. For example, various electrically driven work vehicles are used at mining sites, and large-sized electrically driven work vehicle such as electrically driven dump trucks are also used as work vehicles to be used for transportation. In some cases, electrically driven dump trucks use an electric driving system in which an inverter converts electric power generated by a main-machine generator connected to an engine, and the electric power drives travel motors. In a dump truck on which such an electric driving system is mounted, it is considered that energy conservation and reduction of fuel consumption can be realized by mounting a so-called regenerative braking system that supplies auxiliary machines with regenerative power produced by travel motors at a time of retardation (braking).

As a technology related to such a regenerative braking system, for example, Patent Document 1 discloses a power supply system including: a power supply circuit that outputs a first voltage to a first power line; a power storage section that is connected to the first power line, and is charged by receiving the first voltage; a voltage conversion circuit that has a step-down functionality of stepping down the first voltage from the first power line to a second voltage, and outputting the second voltage to a second power line; and an electrical load that is connected to the second power line, and is driven by receiving the second voltage. The electrical load has the second voltage as an operation voltage lower limit value at which normal operation is ensured, and the power supply system further includes voltage reduction protecting means for stopping step-down operation in the voltage conversion circuit, and also fixing the voltage conversion ratio at approximately one when the step-down functionality of the voltage conversion circuit is impaired.

PRIOR ART DOCUMENT

Patent Document

Patent Document 1: JP-2010-74913-A

SUMMARY OF THE INVENTION

Problem to be Solved by the Invention

In a regenerative braking system, when travel motors are performing regeneration operation that produces regenerative power (regeneration period), the regenerative power of the travel motors is supplied to auxiliary machines via a DC/DC converter. On the other hand, in other periods when the regeneration operation is not performed, electric power generated in an auxiliary-machine generator driven by an engine or the like is supplied to the auxiliary machines. Here, in order to attain a significant energy conservation effect by the regenerative braking system, it is desirable if output of the auxiliary-machine generator is made zero in the regeneration period, and the entire electric power consumption of the auxiliary machines is supplied from the DC/DC converter. Accordingly, in such a case, the supplier of electric power to the auxiliary machines is switched at the start or end of the regeneration period. Since output responses of the auxiliary-machine generator are slower as compared with those of an electric power converter like the DC/DC converter, a voltage supplied to the auxiliary machines fluctuates rapidly in a transient state immediately after the start and end of the regeneration period, and there is a possibility that normal operation of the auxiliary machines is hindered. Particularly, since the auxiliary-machine generator is activated in a state where its output is zero immediately after the end of the regeneration period, there is a concern over a rapid reduction of the voltage supplied to the auxiliary machines. For example, as one possible solution, a large-capacitance smoothing capacitor may be connected to an auxiliary-machine DC line to reduce fluctuations of an auxiliary-machine DC voltage, but this also causes a problem that it takes time to perform initial charging at a time of activation and to perform discharging at a time of deactivation, in addition to problems such as a system size increase or a cost increase.

The present invention has been made in view of the circumstance described above, and an object of the present invention is to provide a regenerative braking system, and an electrically driven work vehicle using the same that enable reduction of fluctuations of a voltage supplied to auxiliary machines at a time of switching of regeneration operation by travel motors.

Means for Solving the Problem

The present application includes a plurality of means for solving the problem described above, and an example thereof is a regenerative braking system including: a first generator and a second generator connected to an engine; a first rectifier circuit that is connected to the first generator, rectifies output of the first generator, and outputs the output of the first generator as direct current electric power to a first direct current line; an inverter connected between the first direct current line and an electric motor; an electric power consuming apparatus that is connected to the first direct current line, and can consume electric power of the first direct current line; a second rectifier circuit that is connected to the second generator, rectifies output of the second generator and, outputs the output of the second generator as direct current electric power to a second direct current line; an auxiliary apparatus connected to the second direct current line; a first electric power converting apparatus that converts the electric power of the first direct current line, and supplies the electric power of the first direct current line to the second direct current line; a power storage apparatus; a second electric power converting apparatus that performs switching between a discharging state where electric power of the power storage apparatus is converted to be supplied to the second direct current line and a charging state where electric power of the second direct current line is converted to be supplied to the power storage apparatus; and a controller. Further, in the regenerative braking system, the controller: determines whether or not the electric motor is performing regeneration operation on a basis of information related to a drive subject of the electric motor; when it is determined that the regeneration operation is being performed, controls the first electric power converting apparatus such that the electric power of the first direct current line is supplied to the second direct current line, and a voltage of the second direct current line becomes a first voltage value predetermined on a basis of an operating voltage specification of the auxiliary apparatus, controls the second generator such that the second generator is deactivated and supply of electric power to the second direct current line is stopped, and controls the second electric power converting apparatus such that the electric power of the second direct current line is supplied to the power storage apparatus; and when it is determined that the regeneration operation is ended, controls the first electric power converting apparatus such that the supply of the electric power from the first direct current line to the second direct current line is stopped, controls the second generator such that the second generator is activated to start supply of electric power to the second direct current line and the voltage of the second direct current line becomes the first voltage value, and controls the second electric power converting apparatus such that the electric power of the power storage apparatus is supplied to the second direct current line and the voltage of the second direct current line becomes a second voltage value that is a voltage value predetermined on a basis of the operating voltage specification of the auxiliary apparatus, and is higher than the first voltage value.

Advantages of the Invention

The present invention enables reduction of fluctuations of a voltage supplied to auxiliary machines at a time of switching of regeneration operation by travel motors.

MODES FOR CARRYING OUT THE INVENTION

Embodiments of the present invention are explained below with reference to the figures. Note that although an electrically driven dump truck is depicted as an example of electrically driven work vehicles in the present embodiments explained, the present invention can be applied also to another electrically driven work vehicle like an electrically driven wheel loader, for example.

First Embodiment

A first embodiment of the present invention is explained with reference to FIG. 1 to FIG. 13.

Figure 1:
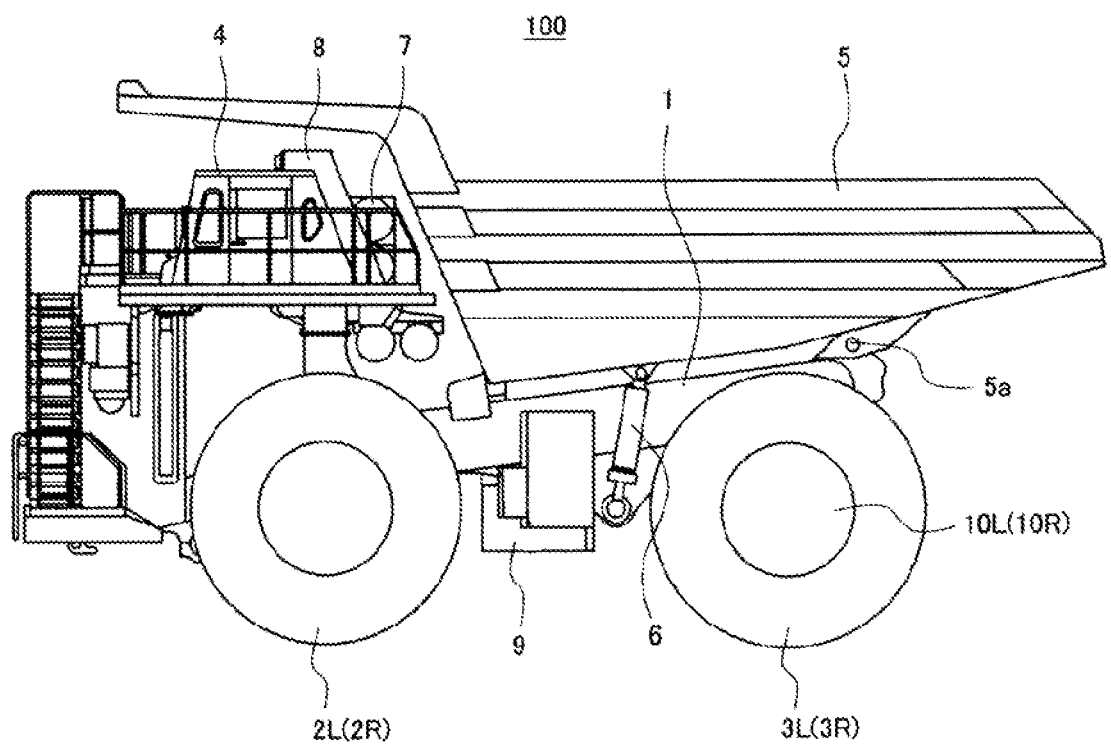
FIG. 1 is a side view schematically depicting the external appearance of an electrically driven dump truck according to a first embodiment.
Figure 2:
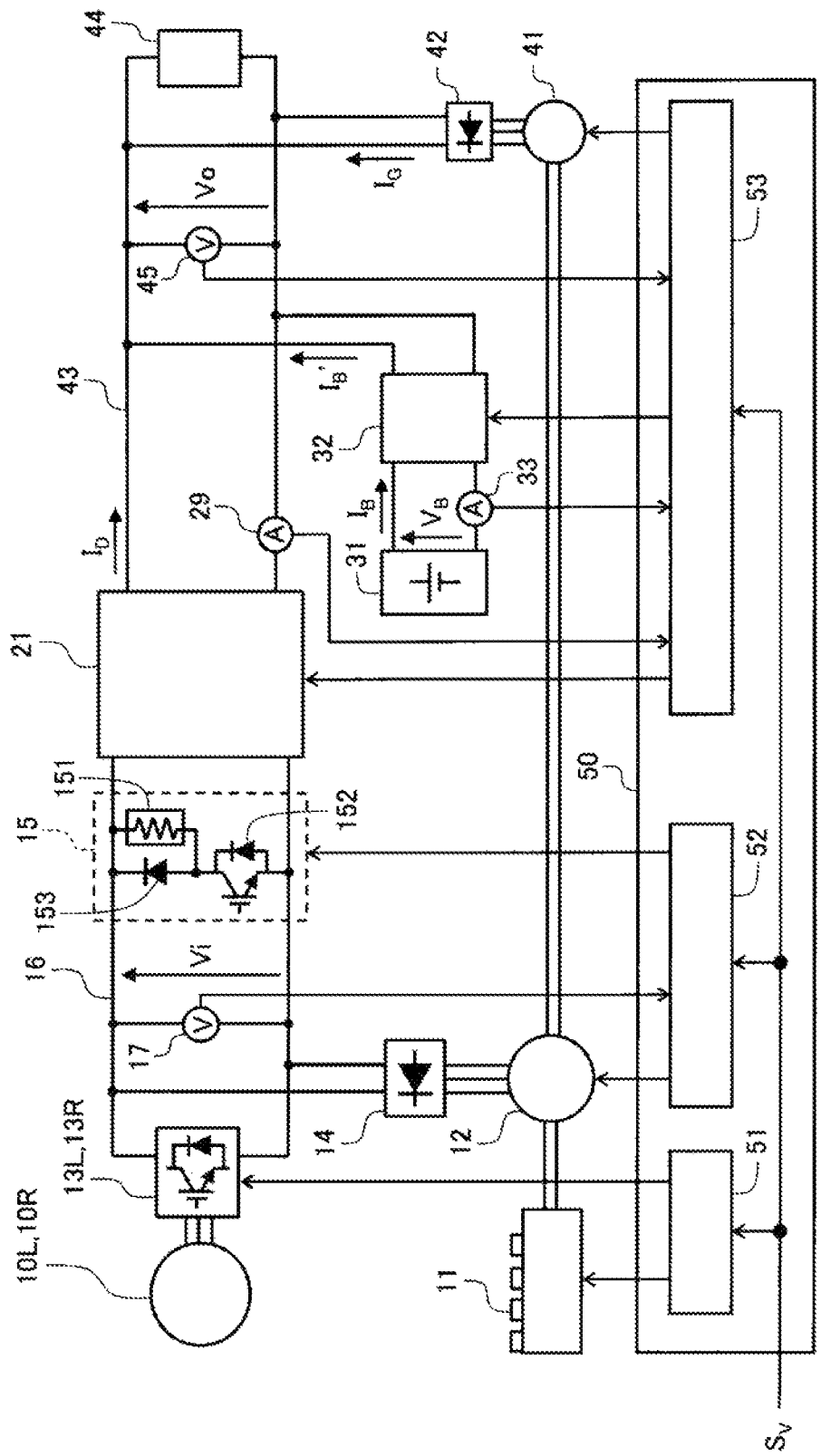
FIG. 2 is a figure schematically depicting an electric driving system including a regenerative braking system of the electrically driven dump truck according to the first embodiment.

FIG. 1 is a side view schematically depicting the external appearance of an electrically driven dump truck according to the present embodiment. In addition, FIG. 2 is a figure schematically depicting an electric driving system including a regenerative braking system of the electrically driven dump truck. Note that, in FIG. 1, only one of each pair of left and right constituent elements like follower wheels, driving wheels, travel motors, and the like is depicted and given a reference character. In the figure, the other one of the pair is omitted in the figure and only a reference character thereof is written in parentheses.

In FIG. 1 and FIG. 2, an electrically driven dump truck 100 generally includes: a body frame 1 that extends toward the front and the back, and forms a support structure; a cargo bed (vessel) 5 that is arranged at an upper portion of the body frame 1 such that it extends toward the front and the back, and is provided such that it is tiltable about its lower rear end portion relative to the body frame 1 via a pin-joining portion 5a; a pair of follower wheels (front wheels) 2L and 2R provided on the left and right sides at a lower front portion of the body frame 1; a pair of driving wheels (rear wheels) 3L and 3R provided on the left and right sides at a lower rear portion of the machine body; an operation room (cab) 4 provided at an upper front side of the body frame 1; a fuel tank 9 provided below the body frame 1; an engine 11 (see FIG. 2) that is arranged on the body frame 1, and is driven by a fuel supplied from the fuel tank 9; and an electric driving system (see FIG. 2) having a main-machine generator 12 (first generator) connected to and driven by the engine 11, travel motors 10L and 10R that drive wheels (the driving wheels 3L and 3R) by using electric power output from the main-machine generator 12, and the like. The travel motors 10L and 10R are housed in rotation shaft portions of the driving wheels 3L and 3R along with speed reduction gears which are not depicted. The body frame 1 and the cargo bed 5 are connected to each other by a hoist cylinder 6, and extension and contraction of the hoist cylinder 6 pivot the cargo bed 5 around the pin-joining portion 5a.

A deck on which an operator can walk is attached to the body frame 1, and the operator can move to the operation room 4 via the deck. An accelerator pedal, a brake pedal, a hoist pedal, a steering wheel, and the like which are not depicted are installed inside the operation room 4. The operator controls acceleration force and braking force of the electrically driven dump truck 100 by adjusting the strokes of the accelerator pedal and the brake pedal in the operation room 4, performs steering operation using hydraulic driving by rotating the steering wheel to the left and right, and perform dumping operation of the cargo bed 5 using hydraulic driving by stepping on the hoist pedal.

A control cabinet 8 housing various types of electric power equipment, and a plurality of grid boxes 7 for releasing, as heat, surplus energy by an electric power consuming apparatus 15 (see FIG. 2) and the like are mounted behind the operation room 4. Note that although not depicted in FIG. 1, an auxiliary-machine generator 41 which is an electric power source for auxiliary machines, a main pump (not depicted) which is a hydraulic fluid source for hydraulic equipment, and the like are mounted on the body frame 1 and between the left and right front wheels 2L and 2R, in addition to the engine 11 and the main-machine generator 12 depicted in FIG. 2.

In FIG. 2, the regenerative braking system of the electrically driven dump truck 100 includes: the main-machine generator 12 (first generator) and the auxiliary-machine generator 41 (second generator) that are connected to the engine 11; a main-machine rectifier circuit 14 (first rectifier circuit) that is connected to the main-machine generator 12, rectifies output of the main-machine generator 12 and, outputs, as DC electric power, the output of the main-machine generator 12 to a main-machine DC line 16 (first DC line); inverters 13L and 13R for travel motors that are connected between the main-machine DC line 16 and the travel motors 10L and 10R; the electric power consuming apparatus 15 that can consume electric power of the main-machine DC line 16; an auxiliary-machine rectifier circuit 42 (second rectifier circuit) that is connected to the auxiliary-machine generator 41, rectifies output of the auxiliary-machine generator 41, and outputs, as DC electric power, the output of the auxiliary-machine generator 41 to an auxiliary-machine DC line 43 (second DC line); an auxiliary apparatus 44 connected to the auxiliary-machine DC line 43; an electric power converting apparatus 21 (first electric power converting apparatus) that converts the electric power of the main-machine DC line 16 and supplies the electric power of the main-machine DC line 16 to the auxiliary-machine DC line 43; a power storage apparatus 31; an electric power converting apparatus 32 (second electric power converting apparatus) that selectively performs either charging operation in which electric power of the auxiliary-machine DC line 43 is converted to be supplied to the power storage apparatus 31 or discharging operation in which electric power of the power storage apparatus 31 is converted to be supplied to the auxiliary-machine DC line 43; and a controller 50 that controls operation of the engine 11, the main-machine generator 12, the auxiliary-machine generator 41, the electric power consuming apparatus 15, the electric power converting apparatus 21, the electric power converting apparatus 32, and the like.

The main-machine rectifier circuit 14 rectifies output of the main-machine generator 12, and outputs, as DC electric power, the output of the main-machine generator 12 to the main-machine DC line 16. In addition, the auxiliary-machine rectifier circuit 42 rectifies the output of the auxiliary-machine generator 41, and outputs, as DC electric power, the output of the auxiliary-machine generator 41 to the auxiliary-machine DC line 43. The main-machine rectifier circuit 14 and the auxiliary machine rectifier circuit 42 each include a diode, for example. Note that, instead of the main-machine rectifier circuit 14 and the auxiliary-machine rectifier circuit 42, AC/DC converters using switching elements may be used. Here, the output current of the auxiliary-machine generator 41 after the rectification by the auxiliary-machine rectifier circuit 42 is defined as (IG). In the following explanation, the output current IG is treated as the output current of the auxiliary-machine generator 41.

For example, each of the main-machine generator 12 and the auxiliary-machine generator 41 is a winding-excitation type synchronous generator, and has an exciter which is an actuator attached thereto. It should be noted that other types of generators can be applied as the main-machine generator 12 and the auxiliary-machine generator 41, and, for example, permanent magnet synchronous generators can be used by using AC/DC converters as the main-machine rectifier circuit 14 and the auxiliary-machine rectifier circuit 42.

For example, the inverters 13L and 13R include IGBTs (Insulated Gate Bipolar Transistors) as switching elements. The DC input terminals of the inverters 13L and 13R are connected to the main-machine DC line 16, and the AC output terminals of the inverters 13L and 13R are connected to the travel motors 10L and 10R.

The electric power consuming apparatus 15, on the basis of a command signal from the controller 50, consumes the electric power of the main-machine DC line 16 (i.e. converts the electric power into thermal energy, and releases the thermal energy). The electric power consuming apparatus 15 has: a switching element 152 and a diode 153 that are connected in series between two positive and negative electrodes of the main-machine DC line 16, and are included in a chopper; and a resistor 151 connected in parallel with the switching element 152. The resistor 151 is mounted on the grid boxes 7. For example, an IGBT is used as the switching element 152.

The auxiliary apparatus 44 is, for example, an inverter and compressor motor system for an air conditioner or an inverter and blower motor system for cooling equipment. Accordingly, the electric power consumption (auxiliary-machine electric power consumption) of the auxiliary apparatus 44 changes corresponding to the travelling state of the electrically driven dump truck 100. Note that these are treated as one equivalent impedance in FIG. 2, and are depicted as the auxiliary apparatus 44.

The electric power converting apparatus 21 converts a main-machine DC voltage Vi of a main-machine system (the main-machine DC line 16) into an auxiliary-machine DC voltage Vo, and supplies the auxiliary-machine DC voltage Vo to an auxiliary-machine system (the auxiliary-machine DC line 43) in a regeneration period mentioned later. The electric power converting apparatus 21 is a so-called DC/DC converter. Here, an output current from the electric power converting apparatus 21 to the auxiliary-machine DC line 43 is defined as ID.

A voltage sensor 17 that senses the voltage (the main-machine DC voltage Vi) of the main-machine DC line 16 is connected between the two positive and negative electrodes of the main-machine DC line 16. The value (sensing value) of the voltage sensed at the voltage sensor 17 is output to the controller 50.

A voltage sensor 45 that senses an auxiliary-machine DC voltage (a second DC voltage: Vo) that is generated in the auxiliary-machine DC line 43 is connected between two positive and negative electrodes of the auxiliary-machine DC line 43. In addition, one of the two positive and negative electrodes of the auxiliary-machine DC line 43 has inserted thereinto a current sensor 29 that senses the direct current (ID) generated in the auxiliary-machine DC line 43. The value (sensing value) of the voltage sensed at the voltage sensor 45 and the value (sensing value) of the current sensed at the current sensor 29 are output to the controller 50.

The electric power converting apparatus 32 selectively performs either discharging operation in which the electric power (a voltage VB) stored in the power storage apparatus 31 converted into (Vo) to be supplied to the auxiliary-machine DC line 43 or charging operation in which the electric power (the voltage Vo) of the auxiliary-machine DC line 43 is converted into (VB) to be supplied to the power storage apparatus 31. The electric power converting apparatus 32 is a so-called bidirectional DC/DC converter. Here, a DC voltage between two positive and negative electrodes of the power storage apparatus 31 is defined as VB, an output current from the power storage apparatus 31 to the electric power converting apparatus 32 is defined as IB, and a current that is generated by conversion by the electric power converting apparatus 32, and is output to the auxiliary-machine DC line 43 is defined as IB'. Note that flows of the current IB and the current IB' output from the power storage apparatus 31 to the auxiliary-machine DC line 43, that is, flows of discharging by the power storage apparatus 31, are treated as positive flows, and flows thereof input from the auxiliary-machine DC line to the power storage apparatus 31, that is, flows of charging by the power storage apparatus 31, are treated as negative flows. In the following explanation, the current IB' is treated as an output current of the electric power converting apparatus 32. As mentioned later, both terminals of the electric power converting apparatus 32, one of which is closer to the power storage apparatus 31 and the other of which is closer to the auxiliary-machine DC line 43, are connected with capacitors. Supposing that the electrostatic capacitances of these capacitors are sufficiently large, and additionally loss at the electric power converting apparatus 32 is negligible, $IB'=IB \times VB/Vo$ holds true in the steady state.

One of the two positive and negative electrodes of the power storage apparatus 31 has inserted thereinto a current sensor 33 that senses the direct current (IB) generated between the power storage apparatus 31 and the electric power converting apparatus 32. The value (sensing value) of the current sensed at the current sensor 33 is output to the controller 50. Note that a fuse, a relay, a breaker, and the like may be inserted between the power storage apparatus 31 and the electric power converting apparatus 32, in addition to the current sensor 33.

In this manner, in the regenerative braking system in FIG. 1, electric power supplied from the main-machine generator 12 via the electric power converting apparatus 21, electric power supplied from the power storage apparatus 31 via the electric power converting apparatus 32, and electric power supplied from the auxiliary-machine generator 41 serve as a power supply of electric power supplied to the auxiliary apparatus 44. Here, a combined current of the currents ID, IB', and IG is defined as an auxiliary-machine power supply current IA (=ID+IB'+IG) as a power supply current of the auxiliary apparatus 44.

The controller 50 receives input of the sensing value Vi from the voltage sensor 17, the sensing value Vo from the voltage sensor 45, and the sensing value IB from the current sensor 33. In addition, the controller 50 receives input of a vehicle information signal SV. The vehicle information signal SV includes a plurality of pieces of information like vehicle speed information about the electrically driven dump truck 100 which is an electrically driven work vehicle, and information about operation input by the operator (the operation amounts of the accelerator pedal and the brake pedal, etc.). Note that although omitted in FIG. 2, the controller 50 may receive input of other information such as AC output currents of the inverters 13, rotation speeds of the travel motors 10, or a rotation speed of the engine 11.

The controller 50 outputs a control signal to each piece of the equipment mentioned above on the basis of sensing signals, and controls an energy flow in the electric driving system. In FIG. 2, control signals from the controller 50 to the engine 11, the main-machine generator 12, the inverters 13L and 13R, the electric power consuming apparatus 15, the electric power converting apparatus 21, the electric power converting apparatus 32, and the auxiliary-machine generator 41 are depicted. Control signals to control operation of the main-machine generator 12 and the auxiliary-machine generator 41 are excitation-voltage or excitation-current command values. That is, exciters of the main-machine generator 12 and the auxiliary-machine generator 41 control excitation voltages or currents according to the command values from the controller 50.

Figure 3:
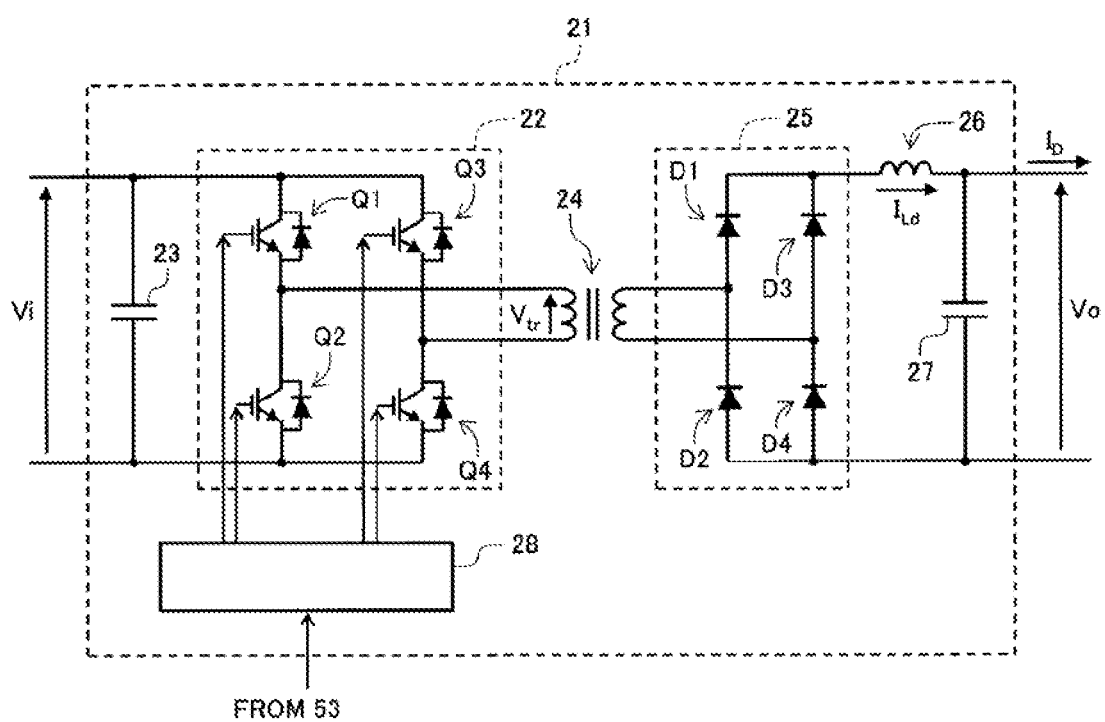
FIG. 3 is a figure schematically depicting an example of configuration of an electric power converting apparatus between a main-machine system and an auxiliary-machine system.

FIG. 3 is a figure schematically depicting an example of configuration of the electric power converting apparatus between the main-machine system and the auxiliary-machine system.

An input terminal of the electric power converting apparatus 21, which is closer to the main-machine DC line 16, is connected with a DC input terminal of an inverter 22 and a capacitor 23. An AC output terminal of the inverter 22 is connected to a primary winding of a transformer 24. A secondary winding of the transformer 24 is connected to an AC input terminal of a rectifier circuit 25. A DC output terminal of the rectifier circuit 25 is connected to an output terminal of the electric power converting apparatus 21, which is closer to the auxiliary-machine DC line 43, via a filter circuit including a choke coil 26 and a capacitor 27.

A drive controller 28 outputs drive voltages of elements Q1 to Q4 included in the inverter 22 on the basis of control signals input from the controller 50. The inverter 22 converts the main-machine DC voltage Vi input to the electric power converting apparatus 21 into an AC voltage Vtr, and applies the AC voltage Vtr to the primary winding of the transformer 24. The transformer 24 changes a voltage applied to the primary winding and generates an AC voltage in the secondary winding while insulating the input and output terminals of the electric power converting apparatus 21 from each other. The AC voltage is converted into a DC voltage by the rectifier circuit 25, and output from the electric power converting apparatus 21 via the filter circuit.

Note that another circuit constituent element may be used as the electric power converting apparatus 21 as long as it is a DC/DC converter. In addition, whereas a full-bridge inverter circuit including the four elements Q1 to Q4 is depicted as an example of the circuit system of the inverter 22, another circuit system may be adopted. For example, whereas the elements Q1 to Q4 are IGBTs in the case depicted as an example in FIG. 2, other types of element such as MOSFETs may be used. In addition, whereas a full-bridge rectifier circuit including four diodes D1 to D4 is depicted as an example of the circuit system of the rectifier circuit 25, another circuit system may be adopted. In addition, other than elements described above, the electric power converting apparatus 21 may include control components such as a breaker or a relay, protecting components such as a fuse or a surge protector, and a noise filter.

Figure 4:
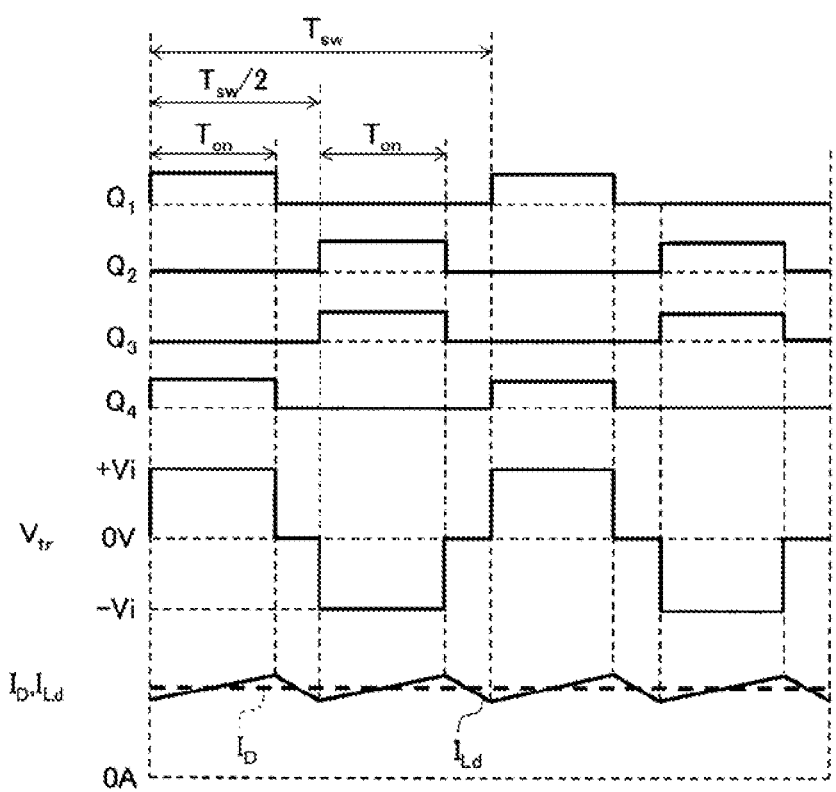
FIG. 4 is a figure depicting an example of operation waveforms of the electric power converting apparatus between the main-machine system and the auxiliary-machine system.

FIG. 4 is a figure depicting an example of operation waveforms of the electric power converting apparatus between the main-machine system and the auxiliary-machine system.

FIG. 4 depicts operation waveforms of two cycles of switching operation of the elements Q1 to Q4. As vertical axis items in FIG. 4, drive signals (ON/OFF signals) of the elements Q1 to Q4, the primary-winding voltage Vtr of the transformer 24, the output current ID, and a current ILd of the choke coil 26 are depicted. The output current ID and the current ILd are depicted in a superimposed manner, and the output current ID is represented by a broken line. Note that FIG. 4 depicts an overview of operation of the electric power converting apparatus 21, and does not reflect voltage/current oscillation caused by parasitic capacitance or parasitic inductance of the circuit, and voltage drops of the elements. In addition, it is supposed that the main-machine DC voltage Vi and the auxiliary-machine DC voltage Vo are constant in the period depicted in FIG. 4. In addition, it is supposed that the electrostatic capacitance of the capacitor 27 is sufficiently large, and the output current ID is constant.

In a period when the elements Q1 and Q4 are turned on, the absolute value of the voltage Vtr becomes equal to the voltage Vi, and the polarity of the voltage Vtr is positive. In a period when the elements Q2 and Q3 are turned on, the absolute value of the voltage Vtr becomes equal to the voltage Vi, but the polarity of the voltage Vtr is negative. In these periods, the current ILd increases over time. In a period when all the elements (the elements Q1 to Q4) are turned off, the voltage Vtr becomes zero, and the current ILd decreases over time. In this manner, the current ILd increases and decreases repeatedly, and the average value is equal to the output current ID. Here, as depicted in FIG. 4, the switching cycle is defined as Tsw, and the ON time of the elements Q1 and Q4 (or the elements Q2 and Q3) is defined as Ton. At this time, the duty cycle dD in pulse width modulation (PWM: Pulse Width Modulation) is (2 Ton)/Tsw. That is, by controlling the duty cycle dD, the output voltage Vo of the electric power converting apparatus 21 can be controlled. If the voltage Vi is constant, the output voltage Vo of the electric power converting apparatus 21 increases as the duty cycle dD is increased.

Figure 5:
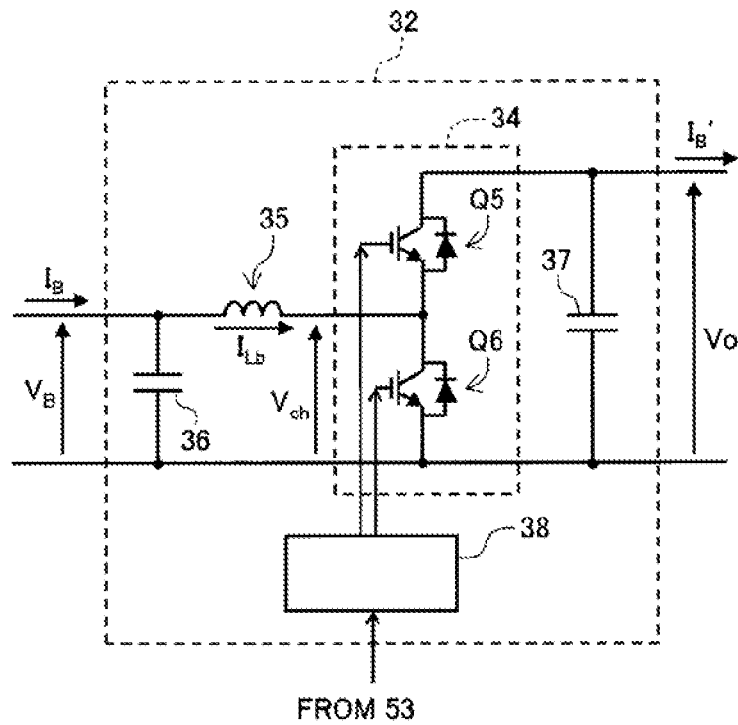
FIG. 5 is a figure schematically depicting an example of configuration of an electric power converting apparatus between a power storage apparatus and an auxiliary-machine DC line.

FIG. 5 is a figure schematically depicting an example of configuration of the electric power converting apparatus between the power storage apparatus and the auxiliary-machine DC line.

The electric power converting apparatus 32 includes upper and lower arms (half bridge circuit) 34 including two elements Q5 and Q6, a choke coil 35, and capacitors 36 and 37. A drive controller 38 outputs drive voltages of the elements Q5 and Q6 on the basis of control signals input from the controller 50.

Figure 6:
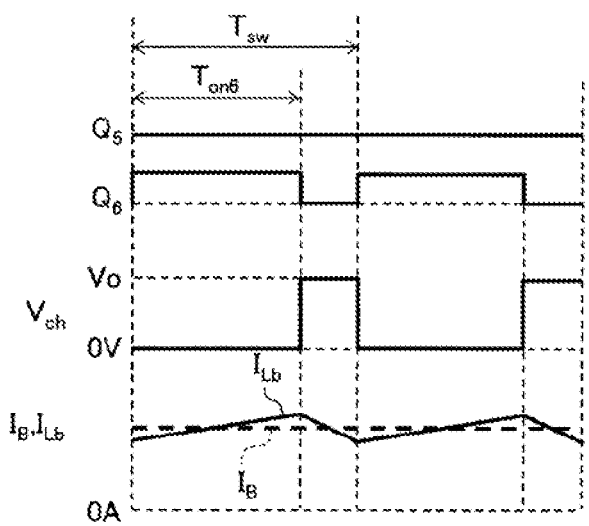
FIG. 6 is a figure depicting an example of operation waveforms of the electric power converting apparatus between the power storage apparatus and the auxiliary-machine DC line, and is a figure depicting how it appears when the power storage apparatus is being discharged.
Figure 7:
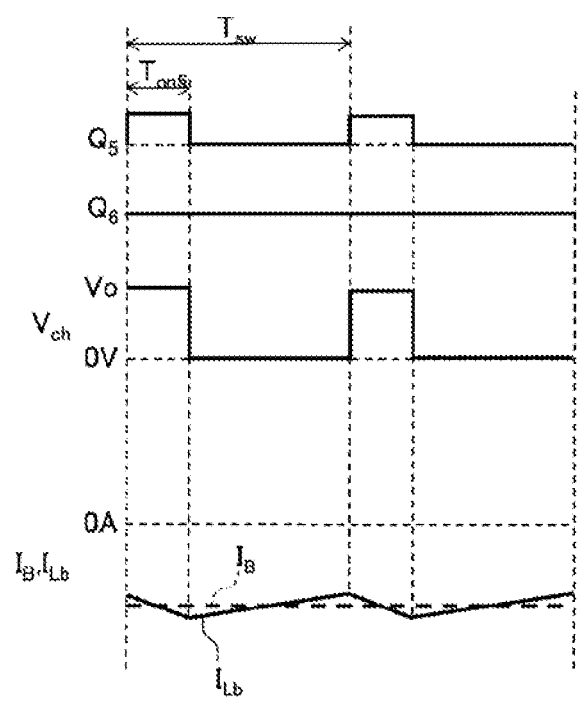
FIG. 7 is a figure depicting an example of operation waveforms of the electric power converting apparatus between the power storage apparatus and the auxiliary-machine DC line, and is a figure depicting how it appears when the power storage apparatus is being charged.

FIG. 6 and FIG. 7 are figures depicting examples of operation waveforms of the electric power converting apparatus between the power storage apparatus and the auxiliary-machine DC line, FIG. 6 depicts how it appears when the power storage apparatus is being discharged, and FIG. 7 depicts how it appears when the power storage apparatus is being charged.

FIG. 6 and FIG. 7 depict operation waveforms of two cycles of switching operation of the elements Q5 and Q6. As vertical axis items in FIG. 6 and FIG. 7, drive signals (ON/OFF signals) of the elements Q5 and Q6, an output voltage Vch of the upper and lower arms 34, a charge/discharge current IB, and a current ILb of the choke coil 35 are depicted. The current IB and the current ILb are depicted in a superimposed manner, and the current IB is represented by a broken line. Note that FIG. 6 and FIG. 7 do not reflect voltage/current oscillation caused by parasitic capacitance or parasitic inductance of the circuit, and voltage drops of the elements. In addition, it is supposed that the voltage VB of the power storage apparatus 31 and the auxiliary-machine DC voltage Vo are constant in the period depicted in FIG. 6 and FIG. 7. In addition, it is supposed that the electrostatic capacitance of the capacitor 36 is sufficiently large, and the current IB is constant. In addition, although omitted in the figures, it is supposed that the electrostatic capacitance of the capacitor 37 also is sufficiently large, and the current IB' also is constant.

In FIG. 6, the electric power converting apparatus 32 is discharging the power storage apparatus 31, and the current IB is positive. At this time, a terminal of the electric power converting apparatus 32 on a side (the left side of FIG. 5) to which the capacitor 36 is connected is an input terminal, and a terminal of the electric power converting apparatus 32 on a side (the right side of FIG. 5) to which the capacitor 37 is connected is an output terminal. The element Q5 is turned off constantly. In a period when the element Q6 is turned on, the voltage Vch becomes 0 (zero), and the voltage VB is applied to the choke coil 35. The current ILb increases over time, and energy is stored in the choke coil 35. In a period when the element Q6 is turned off, energy stored in the choke coil 35 is emitted to the output side through an antiparallel diode of the element Q5, and the current ILb decreases over time. At this time, the voltage Vch becomes an output voltage (the auxiliary-machine DC voltage Vo). In this manner, the current ILb increases and decreases repeatedly, and the average value is equal to the current IB. Here, as depicted in FIG. 6, the switching cycle is defined as Tsw, and the ON time of the element Q6 is defined as Ton6. At this time, a duty cycle dB6 in PWM is Ton6/Tsw. The duty cycle dB6 is an operation amount of the electric power converting apparatus 32 at a time of discharging. If the voltage VB is made constant, the output voltage Vo of the electric power converting apparatus 32 increases as the duty cycle dB6 is increased.

In FIG. 7, the electric power converting apparatus 32 is charging the power storage apparatus 31, and the current IB is negative. At this time, a terminal of the electric power converting apparatus 32 on a side (the right side of FIG. 5) to which the capacitor 37 is connected is an input terminal, and a terminal of the electric power converting apparatus 32 on a side (the left side of FIG. 5) to which the capacitor 36 is connected is an output terminal. The element Q6 is turned off constantly. In a period when the element Q5 is turned on, and the voltage Vch is equal to the voltage Vo, a current flows from the input side to the output side via the element Q5 and the choke coil 35. The absolute value of the current ILb increases over time. When the element Q5 is turned off, the antiparallel diode of the element Q6 becomes conductive, the voltage Vch becomes 0 (zero) and the absolute value of the current ILb decreases over time. Here, as depicted in FIG. 7, the switching cycle is defined as Tsw, and the ON time of the element Q5 is defined as Ton5. At this time, a duty cycle dB5 in PWM is Ton5/Tsw. The duty cycle dB5 is an operation amount of the electric power converting apparatus 32 at a time of charging. If the voltage Vo is made constant, the output VB increases as the duty cycle dB5 is increased.

Here, the duty cycles dB5 and dB6 are integrated into one, and a duty cycle dB having positive and negative polarities is defined. The drive controller 38 receives input of dB as a control signal from the controller 50. The drive controller 38, when the control signal dB is positive, performs control such that the element Q6 is turned on and off as depicted in FIG. 6 with the duty cycle dB6=dB. On the other hand, when the control signal dB is negative, the drive controller 38 performs control such that the element Q5 is turned on and off as depicted in FIG. 7 with the duty cycle dB5=|dB|. That is, when the control signal dB is positive, this represents that discharging is performed, and when the control signal dB is negative, this represents that charging is performed. Note that the average value of the current ILb is equal to the current IB in the steady state. That is, whereas FIG. 2 depicts, as an example, configuration in which the controller 50 uses a sensing value (the current IB) of the current sensor 33, the current ILb may be sensed instead of the current IB, and its average value may be used, in other possible configuration.

FIG. 2 is referred to again.

As depicted in FIG. 2, the controller 50 includes a drive control section 51, a main-machine voltage control section 52, and an auxiliary-machine voltage control section 53.

The drive control section 51 outputs control signals to the engine 11 and the inverters 13 according to the operation amounts of the accelerator pedal and the brake pedal included in the vehicle information signal SV. As mentioned later, the voltage Vi is controlled by the main-machine generator 12 at a time of acceleration, and is controlled by the electric power consuming apparatus 15 at a time of braking.

The main-machine voltage control section 52 determines whether the electrically driven dump truck 100 is being accelerated or decelerated (braked) on the basis of the input vehicle information signal SV, and outputs a control signal to the main-machine generator 12 or the electric power consuming apparatus 15 such that the voltage Vi matches a predetermined command value.

The auxiliary-machine voltage control section 53 outputs control signals to the auxiliary-machine generator 41, the electric power converting apparatus 21, and the electric power converting apparatus 32, which are an auxiliary-machine power supply, such that the auxiliary-machine DC voltage Vo matches a predetermined command value. That is, the voltage Vo is controlled by three auxiliary-machine power supplies, which are the auxiliary-machine generator 41, the electric power converting apparatus 21, and the electric power converting apparatus 32. The auxiliary-machine voltage control section 53 also receives input of the vehicle information signal SV, similarly to the drive control section 51 and the main-machine voltage control section 52.

Note that whereas, as mentioned later, the controller 50 senses the current IB and controls the current IB, the controller 50 may sense the current IB' and control the current IB', instead of the current IB, in other possible configuration. In that case, it is sufficient if the connection position of the current sensor 33 is changed to a position where sensing of the current IB' is possible, and the current command value is converted by using the relational expression (IB'=IB×VB/Vo) mentioned before.

Any method can be used as the realization method of the controller 50, and there is a method, as an example, in which the controller 50 is implemented as an electronic circuit on a substrate. In this case, devices such as a CPU (Central Processing Unit), a DSP (Digital Signal Processor), a microcomputer, and a FPGA (Field-Programmable Gate Array) are mounted on the substrate. The computation content of the auxiliary-machine voltage control section 53 mentioned later is realized by a program or the like executed by these devices. Note that since the controller 50 includes a plurality of computation blocks, the computation blocks may be implemented on different substrates or devices, and these may be integrated to configure the controller 50. In addition, one computation block may be divided and implemented on a plurality of substrates or devices. For example, whereas the auxiliary-machine voltage control section 53 generates control signals for the auxiliary-machine generator 41, the electric power converting apparatus 21, and the electric power converting apparatus 32, generation of the control signals may be allocated to other substrates or devices.

Here, basic energy flows of the electric driving system are explained.

First, an energy flow of the electric driving system at a time of acceleration is explained. When the engine 11 drives the main-machine generator 12, an AC voltage output by the main-machine generator 12 is converted into the main-machine DC voltage Vi by the main-machine rectifier circuit 14, and the main-machine DC voltage Vi is input to the inverters 13. When an operator steps on the accelerator pedal, AC electric power is supplied from the inverters 13 to the travel motors 10, and the travel motors 10 drive wheels to accelerate the vehicle body. In this case, the main-machine DC voltage Vi is controlled by the main-machine generator 12. When the engine 11 drives the auxiliary-machine generator 41, an AC voltage output by the auxiliary-machine generator 41 is converted into a direct current by the auxiliary-machine rectifier circuit 42, and the direct current is input to the auxiliary apparatus 44. In addition, the electric power converting apparatus 32 can discharge the power storage apparatus 31, and supply discharged electric power to the auxiliary apparatus 44.

Next, an energy flow at a time of braking, that is, in the regeneration period of the travel motors 10, is explained. When an operator steps on the brake pedal, the travel motors 10 convert the kinetic energy of the vehicle body into electrical energy, and output the regenerative power to the main-machine DC line 16 via the inverters 13. That is, the travel motors 10 operate as a generator. The electric power consuming apparatus 15 converts the regenerative power into heat, and prevents the main-machine DC voltage Vi from being excessively high. Accordingly, the main-machine DC voltage Vi in this case is controlled by the electric power consuming apparatus 15. The electric power converting apparatus 21 converts the main-machine DC voltage Vi into the auxiliary-machine DC voltage Vo, and outputs part of the regenerative power to the auxiliary-machine DC line 43. The electric power output to the auxiliary-machine DC line 43 is consumed by the auxiliary apparatus 44 or is stored in the power storage apparatus 31 via the electric power converting apparatus 32. Due to the consumption of the regenerative power in this manner, the electric brakes are applied to decelerate the vehicle body. Note that braking of the vehicle body may use, in combination, the electric brakes and mechanical brakes not depicted.

Since the electric power converting apparatus 21 supplies electric power to the auxiliary apparatus 44 at a time of braking, by a corresponding amount, the load on the auxiliary-machine generator 41, and in turn the load on the engine 11 are reduced. Due to such operation, the regenerative power that is generated at a time of braking can be used effectively by auxiliary machines, and energy conservation/fuel consumption reduction of the dump truck by a corresponding amount can be realized. This is a regenerative braking system in the present invention.

Next, the processing content of the auxiliary-machine voltage control section 53 of the controller 50 is explained.

Figure 8:
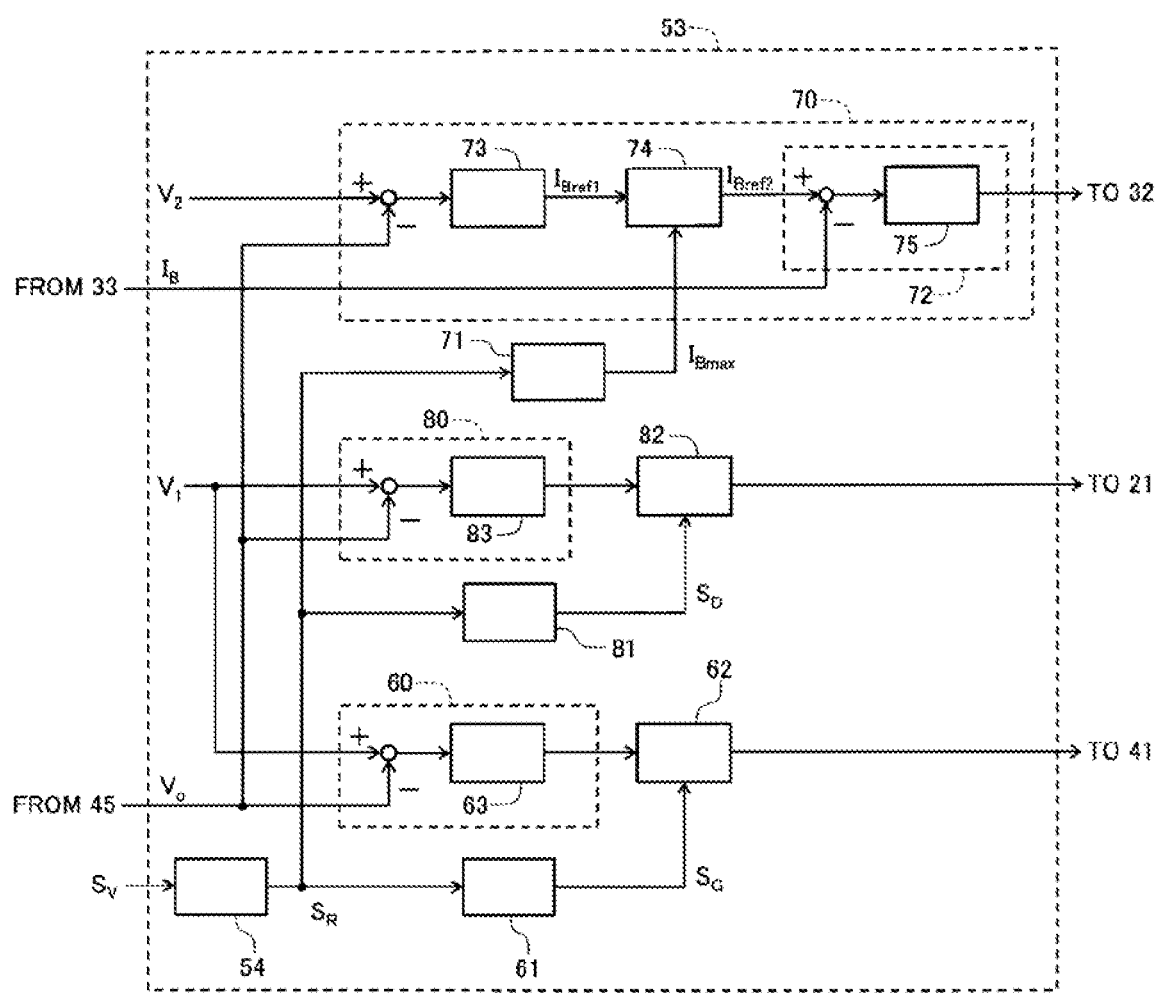
FIG. 8 is a functional block diagram depicting the processing content of an auxiliary-machine voltage control section.

FIG. 8 is a functional block diagram depicting the processing content of the auxiliary-machine voltage control section.

In FIG. 8, the auxiliary-machine voltage control section 53 includes a voltage control system 60 (first voltage control system), a voltage control system 70 (second voltage control system), and a voltage control system 80 (third voltage control system) for controlling the auxiliary-machine DC voltage Vo.

The voltage control system 60 performs computation for controlling the auxiliary-machine generator 41 such that the voltage Vo matches a first voltage command value. In addition, the voltage control system 70 performs computation for controlling the electric power converting apparatus 32 such that the voltage Vo matches a second voltage command value. In addition, the voltage control system 80 performs computation for controlling the electric power converting apparatus 21 such that the voltage Vo matches a third voltage command value.

In the present embodiment, the first voltage command value and the third voltage command value are set to V1, and the second voltage command value is set to V2. At this time, the voltages V2 and V1 are set such that V2>V1 is satisfied. Note that a tolerance range (operating voltage specification) for normal operation of the auxiliary apparatus 44 is predetermined for the voltage Vo on the basis of withstand voltage characteristics, operation characteristics, or the like, and the voltages V1 and V2 have values in the tolerance range.

The auxiliary-machine voltage control section 53 determines whether it is the regeneration period, and, on the basis of a result of the determination, performs ON/OFF control of the electric power converting apparatus 21 and the auxiliary-machine generator 41. A regeneration period determining section 54 determines whether it is the regeneration period on the basis of the vehicle information signal SV, and generates a regeneration period determination signal SR. A possible example of the regeneration period determination signal SR is a digital signal that becomes a H (high) level in the regeneration period, and becomes a L (low) level in a period (hereinafter, referred to as a non-regeneration period) other than the regeneration period. The regeneration period determination signal SR is output to an ON/OFF switch section 81 (second ON/OFF switch section), an ON/OFF switch section 61 (first ON/OFF switch section), and an upper limit value setting section 71 (first upper limit value setting section) mentioned later.

The vehicle information signal SV includes vehicle speed information and operator operation input information. For example, information about brake pedal operation by an operator, deceleration of the vehicle body, and the like allows a determination as to whether or not it is the regeneration period. Note that although omitted in the figure, a determination as to whether it is the regeneration period may be made by sensing AC output currents of the inverters 13, calculating the torque of the travel motors 10, and calculating regenerative power from the torque and the rotation speeds of the travel motors 10. At this time, when the regenerative power is greater than a predetermined threshold, it is determined that it is the regeneration period. Instead of using sensed AC output currents of the inverters 13, a current command value computed at the drive control section 51 may be used. On the basis of what is stated thus far, the regeneration period determining section 54 may receive input of not only the vehicle information signal SV, but also other information necessary for a determination as to whether it is the regeneration period.

The ON/OFF switch section 81 generates an ON/OFF signal SD that is associated with ON/OFF control of the electric power converting apparatus 21. The ON/OFF signal SD is generated such that the electric power converting apparatus 21 is operated (is turned on) in the regeneration period. The generated ON/OFF signal SD is output to an ON/OFF control section 82 (second ON/OFF control section) mentioned later. A possible example of the ON/OFF signal SD is such a digital signal that becomes a H (high) level when in the ON state, and becomes a L (low) level when in the OFF state. In this case, the ON/OFF signal SD is the same as the regeneration period determination signal SR.

The ON/OFF switch section 61 generates an ON/OFF signal SG that is associated with ON/OFF control of the auxiliary-machine generator 41. The ON/OFF signal SG is generated such that the auxiliary-machine generator 41 is operated (is turned on) in the non-regeneration period. The generated ON/OFF signal SG is output to an ON/OFF control section 62 (first ON/OFF control section) mentioned later. A possible example of the ON/OFF signal GS is such a digital signal that becomes a H (high) level when in the ON state, and becomes a L (low) level when in the OFF state. In this case, the ON/OFF signal SG is the same as a signal SP obtained by inverting the regeneration period determination signal SR.

Figure 9:
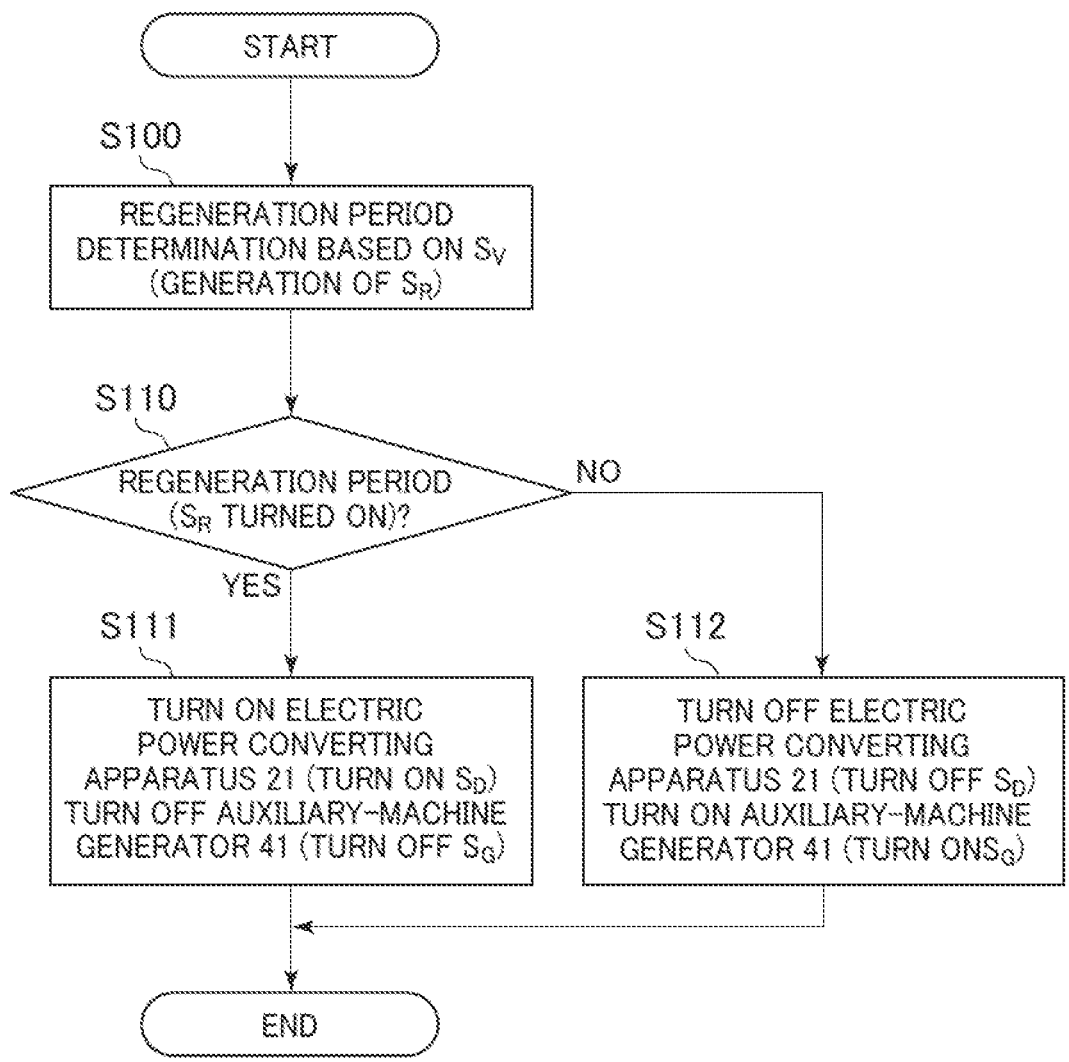
FIG. 9 is a flowchart depicting the processing content of ON/OFF switching of the electric power converting apparatus and an auxiliary-machine generator by a regeneration period determining section.

FIG. 9 is a flowchart depicting the processing content of ON/OFF switching of the electric power converting apparatus and the auxiliary-machine generator by the regeneration period determining section. Where computation of the auxiliary-machine voltage control section 53 is realized by a program or the like at the CPU, an ON/OFF switching process based on the flowchart depicted in FIG. 9 is executed cyclically.

In FIG. 9, first, the regeneration period determining section 54 determines whether or not it is the regeneration period on the basis of the vehicle information signal SV, and generates the regeneration period determination signal SR according to a result of the determination (Step S100). Next, it is determined whether or not it is the regeneration period, that is, whether or not the regeneration period determination signal SR is turned on (Step S110), and, when the result of the determination is YES, H (high) is output as the ON/OFF signal SD to thereby perform control such that the electric power converting apparatus 21 is turned on, L (low) is output as the ON/OFF signal SG to thereby perform control such that the auxiliary-machine generator 41 is turned off (Step S111), and the process is ended. In addition, when the result of the determination at Step S110 is NO, that is, it is determined that it is not the regeneration period, L (low) is output as the ON/OFF signal SD to thereby perform control such that the electric power converting apparatus 21 is turned off, H (high) is output as the ON/OFF signal SG to thereby perform control such that the auxiliary-machine generator 41 is turned on (Step S112), and the process is ended.

Here, control computation of the electric power converting apparatus 21 is explained. In the voltage control system 80, after the deviation (V1−Vo) between the voltage V1 and the voltage Vo is calculated, a voltage control computing section 83 calculates an operation amount of the electric power converting apparatus 21, and outputs the operation amount to the ON/OFF control section 82. Specifically, on the basis of a control law such as proportional integral (PI: Proportional Integral) control, the operation amount is changed such that the deviation decreases. According to the configuration of the electric power converting apparatus 21, the duty cycle dD of PWM becomes the operation amount. The ON/OFF control section 82 outputs the operation amount generated by the voltage control computing section 83 with no changes being made thereto on the basis of the ON/OFF signal SD when in the ON state. When in the OFF state, the operation amount is changed to zero, and output. Output of the ON/OFF control section 82 is output as a control signal to the electric power converting apparatus 21.

Next, control computation of the auxiliary-machine generator 41 is explained. In the voltage control system 60, after the deviation (V1−Vo) between the voltage V1 and the voltage Vo is calculated, a voltage control computing section 63 calculates an operation amount of the auxiliary-machine generator 41, and outputs the operation amount to the ON/OFF control section 62. As mentioned before, it is supposed that the auxiliary-machine generator 41 is a winding-excitation type synchronous generator, and an excitation-voltage or excitation-current command value is used as an operation amount. The ON/OFF control section 62 outputs the operation amount generated by the voltage control computing section 63 with no changes being made thereto on the basis of the ON/OFF signal SG when in the ON state. When in the OFF state, the operation amount is changed to zero, and output. Output of the ON/OFF control section 62 is output as a control signal to the auxiliary-machine generator 41.

Next, control computation of the electric power converting apparatus 32 is explained. As a minor loop, the voltage control system 70 includes a current control system 72 for controlling the charge/discharge current IB of the power storage apparatus 31. As mentioned before, instead of the current IB, the current IB' or the current ILb may be controlled. In the voltage control system 70, after the deviation (V2−Vo) between the voltage V2 and the voltage Vo is calculated, a voltage control computing section 73 generates a current command value. This current command value is defined as a pre-limiter-processing current command value IBref1 (first current command value). Specifically, on the basis of a control law such as PI control, the pre-limiter-processing current command value IBref1 is changed such that the deviation is reduced. The pre-limiter-processing current command value IBref1 is input to a variable limiter 74 on the downstream side. The variable limiter 74 also receives input of a current upper limit value IBmax mentioned later. The variable limiter 74 implements limiter processing on the pre-limiter-processing current command value IBref1 using IBmax as the upper limit value, and generates a post-limiter-processing current command value IBref2 (second current command value). The post-limiter-processing current command value IBref2 is input to the current control system 72.

In the current control system 72, after the deviation (IBref2−IB) between the post-limiter-processing current command value IBref2 and the current IB is calculated, a current control computing section 75 computes and outputs an operation amount of the electric power converting apparatus 32. Specifically, on the basis of a control law such as PI control, the operation amount is changed such that the deviation is reduced. According to the configuration of the electric power converting apparatus 32, the duty cycle dB of PWM becomes the operation amount. The operation amount generated by the current control computing section 75 is output as a control signal to the electric power converting apparatus 32. The upper limit value setting section 71 generates the upper limit value IBmax of the pre-limiter-processing current command value IBref1 from the regeneration period determination signal SR, and outputs the upper limit value IBmax to the variable limiter 74. A specific method of generating IBmax is mentioned later along with an operation timing chart and a block diagram. Note that although omitted in the figure, in other possible configuration, in the voltage control system 80 of the electric power converting apparatus 21 also, a current control system as a minor loop may be provided similarly to the voltage control system 70, and the output current ID or current ILd of the electric power converting apparatus 21 may be controlled.

Figure 10:
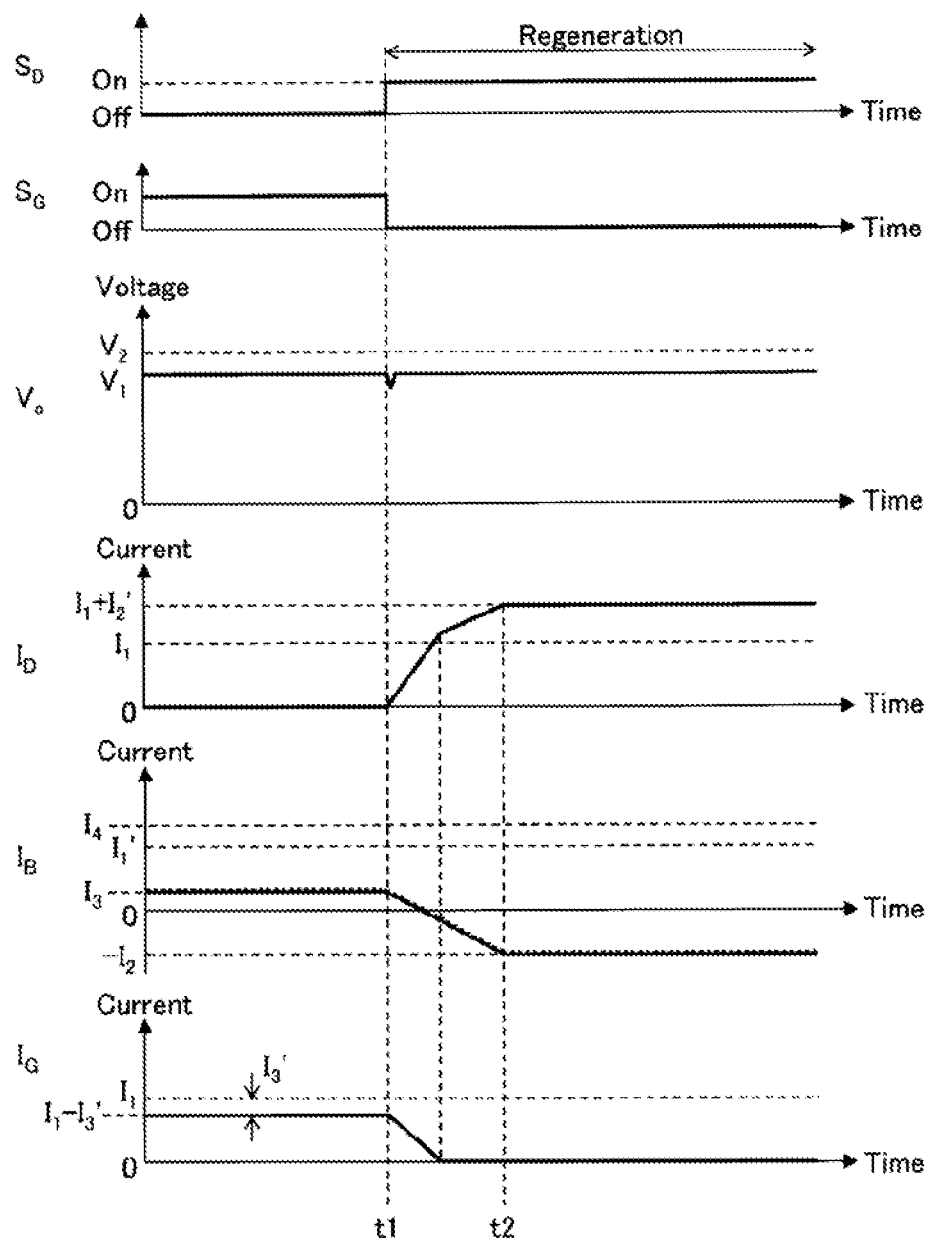
FIG. 10 is a timing chart depicting an example of operation waveforms of the electric driving system, and is a figure depicting how it appears at the start of a regeneration period.
Figure 11:
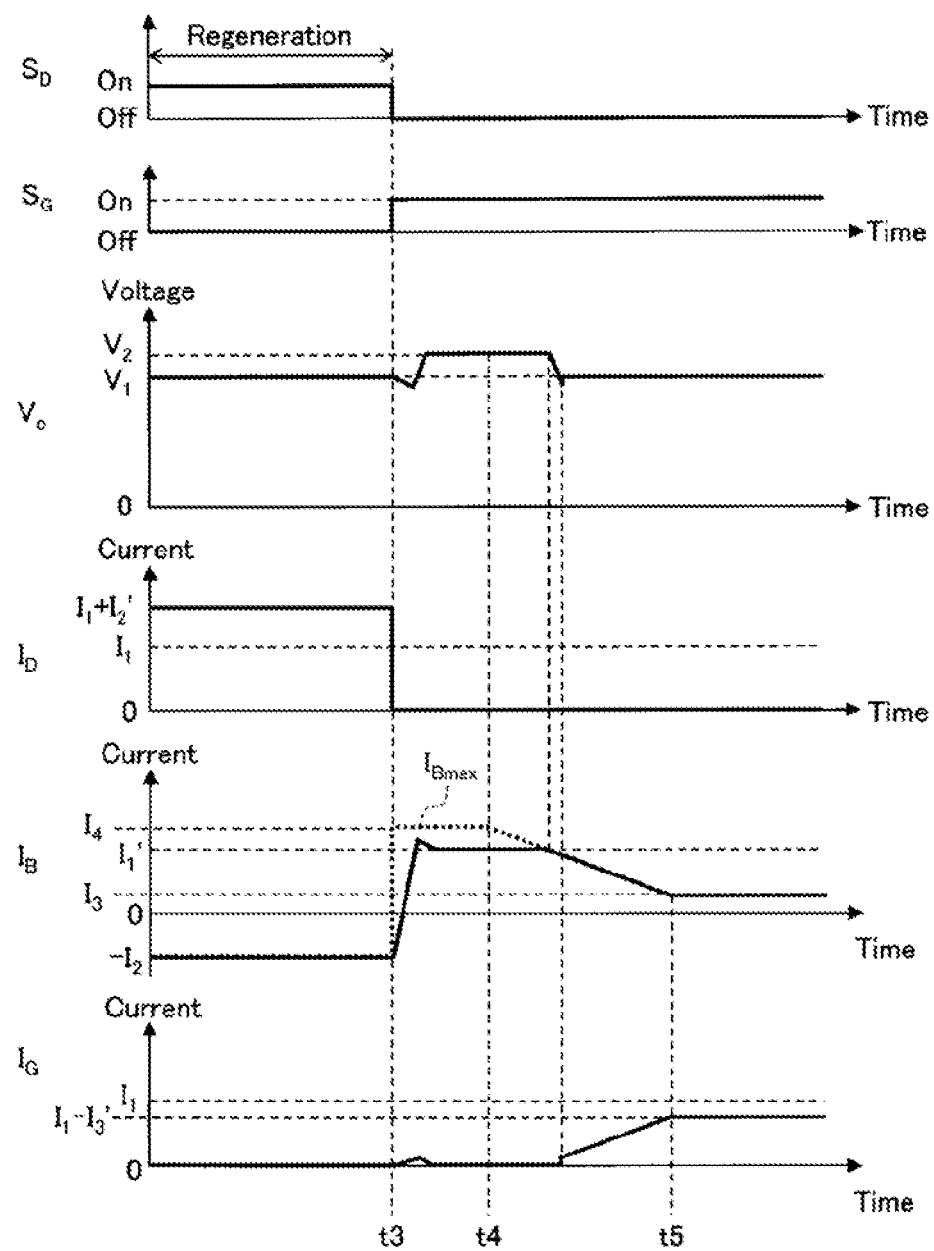
FIG. 11 is a timing chart depicting an example of operation waveforms of the electric driving system, and is a figure depicting how it appears at the end of the regeneration period.

FIG. 10 and FIG. 11 are timing charts depicting examples of operation waveforms of the electric driving system, FIG. 10 depicts how it appears at the start of the regeneration period, and FIG. 11 depicts how it appears at the end of the regeneration period.

Vertical axis items in FIG. 10 and FIG. 11 are the ON/OFF signals SD and SG of the electric power converting apparatus 21 and the auxiliary-machine generator 41, the auxiliary-machine DC voltage Vo, the output current ID of the electric power converting apparatus 21, the charge/discharge current IB of the power storage apparatus 31, and the output current IG of the auxiliary-machine generator 41. The current IB is depicted with the current upper limit value IBmax represented by a dotted line superimposed thereon. In addition, it is supposed that a current input to the auxiliary apparatus 44 is constant in the depicted period, and the value of the current is depicted as a current I1 in the figure. Note that FIG. 10 and FIG. 11 depict outlines of changes in the voltages and the currents, and depict them as linearly changing voltages or currents, but the actual voltages and currents do not necessarily change linearly.

First, operation at the start of the regeneration period is explained. Times t1 and t2 are defined as depicted in FIG. 10, and it is supposed that the regeneration period starts at time t1. That is, the regeneration period determining section 54 determines that the regeneration period has started at time t1. Operation in the period before time t1, the period from time t1 to time t2, and the period from time t2 is explained below in order by using FIG. 11. Note that the current IB and the current IBmax almost match in FIG. 10. This means that the current IB is restricted by the variable limiter 74 as mentioned later.

The period before time t1 is the non-regeneration period, the electric power converting apparatus 21 is turned off, and the auxiliary-machine generator 41 is turned on. Since the electric power converting apparatus 21 is turned off, the current ID is 0 (zero). In addition, for a reason mentioned later, the voltage Vo is controlled to become the voltage V1 by the auxiliary-machine generator 41.

The upper limit value setting section 71 sets the current IBmax to I3. I3 is a positive value or 0 (zero). That is, this is a state where the electric power converting apparatus 32 can discharge the power storage apparatus 31, but the discharge current IB is restricted to the current I3. It is defined here that the output current IB' of the electric power converting apparatus 32 becomes a current I3' when the current IB is controlled to become the current I3. Mutual conversion between the current IB and the current IB' has already been explained, and therefore its explanation is omitted. The current I3 is set so as to satisfy I3'<I1. Accordingly, this is a state where the electric power converting apparatus 32 cannot singly supply the entire auxiliary-machine electric power. The deficiency of the electric power is I1−I3'.

The voltage control system 70 for the electric power converting apparatus 32 operates so as to increase the voltage Vo to the voltage V2. However, no matter how the voltage control computing section 73 increases the pre-limiter-processing current command value IBref1 in the voltage control system 70, the variable limiter 74 restricts the post-limiter-processing current command value IBref2 to IBmax=I3. As mentioned above, only with discharging of the power storage apparatus 31 at the current I3, the entire auxiliary-machine electric power cannot be supplied. In a state where the variable limiter 74 is applied in this manner, the electric power converting apparatus 32 operates in a constant current (CC: Constant Current) mode, and the voltage Vo cannot be controlled to become the voltage V2. The current command value in the constant current mode is IBmax=I3. The current IB is controlled by the current control system 72 to become the current I3, and the current IB' becomes the current I3'.

The voltage control system 60 for the auxiliary-machine generator 41 operates to perform control such that the voltage Vo becomes the voltage V1. As a result, in this state, the voltage Vo is controlled by the auxiliary-machine generator 41 to become the voltage V1, and the current IG becomes the deficiency current I1-I3' mentioned above.

Note that whereas it is supposed in FIG. 10 that the current IBmax is constant at the current I3, the current IBmax may be changed depending on the remaining charge of the power storage apparatus 31. For example, if a voltage sensor for sensing the voltage VB of the power storage apparatus 31 is added to the electric driving system in the present embodiment, the remaining charge can be calculated from a sensing value of the voltage VB. In addition, the remaining charge may be calculated by integration of the current IB. Where the remaining charge has reached the lower limit value, the current IBmax may be made zero. If the current IBmax is zero, the current IG becomes I1, and the auxiliary-machine generator 41 singly supplies the entire auxiliary-machine electric power in this state.

In the period from time t1 to time t2, the regeneration period starts at time t1, the electric power converting apparatus 21 is turned on, and the auxiliary-machine generator 41 is turned off. Even if the excitation winding voltage of the auxiliary-machine generator 41 is made 0 (zero), the inductance of the excitation winding gradually reduces the excitation current. Accordingly, the current IG also gradually decreases to 0 (zero).

From time t1 to time t2, the upper limit value setting section 71 gradually reduces the current IBmax toward a negative value (−I2). Here, attention should be paid to the fact that the current I2>0 (zero). Whereas the current IBmax is reduced linearly in an example depicted in FIG. 10, this is not the sole example. The post-limiter-processing current command value IBref2 decreases according to the current IBmax, and current IB also decreases according to the current IBmax due to operation of the current control system 72. That is, the constant current mode mentioned above continues, and the current command value gradually decreases, in this operation. When the positive current IB turns negative along with the current IBmax, the power storage apparatus 31 that has been being discharged starts being charged. The current IB' also decreases according to the current IB. It is defined here that the current IB' becomes the current (−I2') when the current IB is controlled to become (−I2).

The voltage control system 80 for the electric power converting apparatus 21 starts operation such that the voltage Vo is controlled to become the voltage V1. As a result, in response to the reductions of IG and IB' mentioned above, the electric power converting apparatus 21 gradually increases ID such that the auxiliary-machine power supply current IA (=ID+IB'+IG) matches I1. When IG becomes zero, and IB' becomes −I2', ID becomes I1+I2'. By gradually reducing IB in the manner mentioned above, load fluctuations of the electric power converting apparatus 21 are reduced, and transient fluctuations of Vo are reduced. Note that, actually the gradually decreasing IG and IB' become disturbances, and Vo becomes slightly lower than V1. (a) in FIG. 8 does not reflect this, and it is supposed Vo matches V1.

In the period from time t2, the voltage Vo is controlled by the electric power converting apparatus 21 to become the voltage V1. The current ID becomes I1+I2', the current IB becomes (−I2), and the current IG becomes 0 (zero). At this time, the power storage apparatus 31 is being charged, and the charge current is equal to the current I2. In this manner, in the regeneration period, while the electric power converting apparatus 21 supplies the entire auxiliary-machine electric power consumption, the electric power converting apparatus 32 supplies electric power for charging the power storage apparatus 31. After the start of the regeneration period, the auxiliary-machine power supply is switched from the auxiliary-machine generator 41 to the electric power converting apparatus 21.

Note that whereas it is supposed in FIG. 10 that the current IBmax is constant at the current (−I2), the current IBmax may be changed depending on the remaining charge of the power storage apparatus 31. For example, where the remaining charge has reached the upper limit value, the current IBmax may be made zero. By charging the power storage apparatus 31 in the regeneration period, energy necessary for discharging mentioned later is stored.

Next, operation at the end of the regeneration period is explained. Times t3, t4 and t5 are defined as depicted in FIG. 11. It is supposed that the regeneration period ends at time t3. Operation in the period from time t3 to time t4 and the period from time t4 to time t5 is explained below in order by using FIG. 11. Note that the operation in the period before time t3 is similar to the operation in the period from time t2 (see FIG. 10), also the operation in the period from time t5 is similar to the operation in the period before time t1 (see FIG. 10), and therefore explanations of both of them are omitted.

It is supposed that, in the period from time t3 to time t4, the regeneration period ends at time t3. At this time, the electric power converting apparatus 21 is turned off, and the current ID decreases to 0 (zero). On the other hand, the auxiliary-machine generator 41 is turned on.

The upper limit value setting section 71 changes the current IBmax to a positive value 14. By making the current IBmax a positive value, it becomes possible for the electric power converting apparatus 32 to discharge the power storage apparatus 31. It is defined here that the current IB' becomes I4' when the current IB is controlled to become the current I4. The current I4 is set such that I4'>I1 is satisfied. That is, the electric power converting apparatus 32 is tolerated to supply the entire auxiliary-machine electric power singly. Note that it is defined that the current IB' becomes the current I1 when the current IB is controlled to become I1'. Since I4'>I1, I1'<I4.

The voltage control system 70 for the electric power converting apparatus 32 increases the post-limiter-processing current command value IBref2 to a positive value in order to increase the voltage Vo to V2. Operation of the current control system 72 increases the current IB, and the negative current IB turns positive. That is, the power storage apparatus 31 that has been being charged starts being discharged. Along with the current IB, the negative current IB' also turns positive.

Since the current IA (=ID+IB'+IG) is small as compared with the current I1 immediately after time t3, the voltage Vo decreases from V1. The voltage control system 60 for the auxiliary-machine generator 41 operates so as to increase the voltage Vo to V1, and thereby the current IG starts flowing. In this manner, both the electric power converting apparatus 32 and the auxiliary-machine generator 41 output currents in order to prevent the voltage Vo from decreasing. However, since the auxiliary-machine generator 41 responds slowly as compared with the electric power converting apparatus 32, the current IG barely increases, and the current IB' almost singly makes the voltage Vo increase.

If the voltage Vo is lower than V2 even after the voltage Vo has reached V1, the electric power converting apparatus 32 tries to increase the current IB'. If this makes the voltage Vo greater than V1, the auxiliary-machine generator 41 tries to reduce the current IG. As a result, in this state, the electric power converting apparatus 32 singly supplies the entire auxiliary-machine electric power, the current IB' becomes I1, and the current IB becomes I1'. In addition, the current IG decreases to zero. In this state, the voltage Vo is controlled by the electric power converting apparatus 32 to become the voltage V2. At this time, the electric power converting apparatus 32 operates in a constant voltage (CV: Constant Voltage) mode.

In this manner, whereas both the auxiliary-machine generator 41 and the electric power converting apparatus 32 try to control the voltage Vo, in this state, the output of electric power by the electric power converting apparatus 32 is prioritized since V2>V1.

In the period from time t4 to time t5, the upper limit value setting section 71 gradually reduces the current IBmax from I4 to I3 mentioned above after time t4 at which a predetermined length of time has elapsed after the end of the regeneration period. Note that whereas the current IBmax is reduced linearly in FIG. 11, this is not the sole example. In a period when the current IBmax is greater than I1', the voltage Vo is controlled to become V2 by the current IB being controlled by the electric power converting apparatus 32 to become I1'. If the current IBmax becomes smaller than I1', it becomes not possible for the electric power converting apparatus 32 to singly supply the auxiliary-machine electric power. The electric power converting apparatus 32 makes a transition to the constant current mode explained already. It becomes not possible for the electric power converting apparatus 32 to maintain the voltage Vo at V2, and the voltage Vo decreases from V2. If the voltage Vo becomes lower than V1, the voltage control system 60 for the auxiliary-machine generator 41 operates so as to increase the voltage Vo to V1, and the current IG starts flowing again. Since the reduction of the current IB is controlled to become gentle, even the auxiliary-machine generator 41, which responds slowly, can operate to follow the reduction, and the auxiliary-machine generator 41 controls the voltage Vo such that it becomes V1 by increasing the current IG gradually.

Here, the processing content of the upper limit value setting section 71 is explained in detail.

Figure 12:
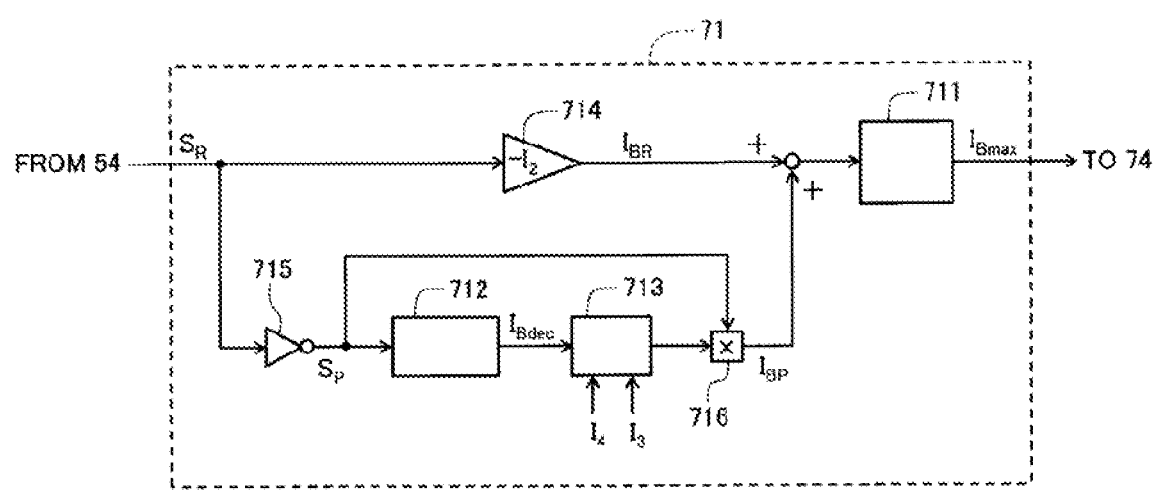
FIG. 12 is a functional block diagram depicting the processing content of an upper limit value setting section.
Figure 13:
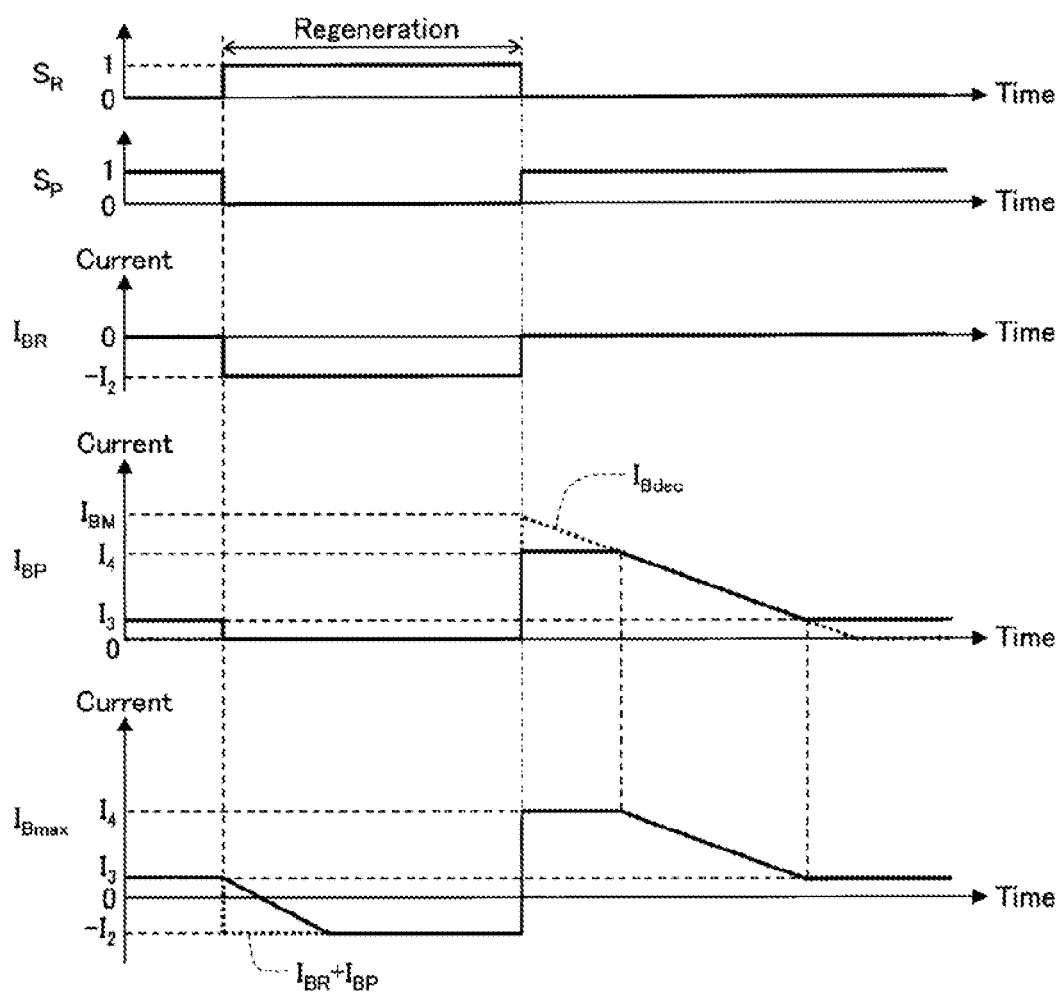
FIG. 13 is a figure depicting an example of operation waveforms of the upper limit value setting section.

FIG. 12 is a functional block diagram depicting the processing content of the upper limit value setting section. In addition, FIG. 13 is a figure depicting an example of operation waveforms of the upper limit value setting section.

As depicted in FIG. 12, on the basis of the regeneration period determination signal SR input from the regeneration period determining section 54, the upper limit value setting section 71 generates the current upper limit value IBmax. In the following explanation, the values of the regeneration period determination signal SR and an inverted signal SP thereof are 1 when they are at H (high) levels, and 0 (zero) when they are at L (low) levels.

The current upper limit value IBmax output by the upper limit value setting section 71 is generated by applying a falling change rate limiter 711 to a value obtained by adding together a regeneration-period current upper limit value IBR and a non-regeneration-period current upper limit value IBP mentioned later.

The regeneration-period current upper limit value IBR is generated by multiplying the regeneration period determination signal SR by the value (−I2) at a multiplier 714. That is, since the regeneration period determination signal SR=1 in the regeneration period, the current upper limit value IBR=−I2. In addition, since the regeneration period determination signal SR=0 (zero) in the non-regeneration period, the current upper limit value IBR=0 (zero).

The non-regeneration-period current upper limit value IBP is generated on the basis of the inverted signal SP generated from the regeneration period determination signal SR by a logical inverter (logical negator 715). A transient-decay current command generating section 712 generates a transient-decay current command value IBdec from the signal SP in the following manner. By being triggered by the time point of the end of the regeneration period, that is, a rise of the signal SP, the transient-decay current command generating section 712 increases the transient-decay current command value IBdec to a positive value IBM. Thereafter, the transient-decay current command generating section 712 attenuates the transient-decay current command value IBdec to zero. The value IBM is set to a value greater than the current I4.

The transient-decay current command value IBdec is input to a limiter 713. The limiter 713 implements limiter processing on the transient-decay current command value IBdec such that the upper limit value becomes I4, and the lower limit value becomes I3. By multiplying output of the limiter 713 by the signal SP at a multiplier 716, the current upper limit value IBP is generated. Since the signal SP=0 (zero) in the regeneration period, the current upper limit value IBP=0 (zero). The signal SP=1 in the non-regeneration period. In this case, the upper limit value and lower limit value of the current upper limit value IBP become I4 and I3, respectively. Note that FIG. 13 depicts the current upper limit value IBP and the transient-decay current command value IBdec in a superimposed manner, and the transient-decay current command value IBdec is represented by a dotted line.

The falling change rate limiter 711 is a change rate limiter that acts only on a fall of the input current value (IBR+IBP). In FIG. 13, the current IBmax and the current value (IBR+IBP) are depicted in a superimposed manner, and the current value (IBR+IBP) is represented by a dotted line.

Actions and advantages in the thus-configured present embodiment are explained.

In the present embodiment, after the start of the regeneration period, the auxiliary-machine power supply is switched from the auxiliary-machine generator 41 to the electric power converting apparatus 21. That is, output of the auxiliary-machine generator 41 is made zero, and the entire auxiliary-machine electric power gets to be supplied from the electric power converting apparatus 21. Thereby, the energy conservation effect of the regenerative braking system can be enhanced.

In addition, at the end of the regeneration period, in addition to the auxiliary-machine generator 41, the electric power converting apparatus 32 discharges the power storage apparatus 31, and it becomes possible thereby to reduce a rapid decrease in the auxiliary-machine DC voltage Vo. At this time, by setting the voltage command value V2 of the electric power converting apparatus 32 greater than the voltage command value V1 of the auxiliary-machine generator 41, output of electric power from the electric power converting apparatus 32, which responds faster than the auxiliary-machine generator 41, is prioritized. Accordingly, a rapid decrease in the auxiliary-machine DC voltage Vo can be reduced more surely. Since the electric power converting apparatus 32 operates in the constant voltage mode, the voltage control system 70 automatically increases or decreases the current command values (IBref1, IBref2) in response to an increase or decrease in the auxiliary-machine electric power after the end of the regeneration period even if such an increase or decrease occurs, and can control the voltage Vo such that it becomes V2. In this manner, even when there are fluctuations of the auxiliary-machine electric power consumption, rapid fluctuations of the voltage Vo can be prevented.

In addition, after a lapse of a predetermined length of time since the end of the regeneration period, the upper limit value setting section 71 reduces the current IBmax. Thereby, the remaining charge of the power storage apparatus 31 can be prevented from becoming excessively small when the capacity of the power storage apparatus 31 is not sufficient. In addition, by reducing the current IBmax gradually, it becomes possible for the auxiliary-machine generator 41 to increase its output to follow the reduction, and it becomes possible to prevent rapid fluctuations of the voltage Vo.

In addition, since fluctuations of the voltage Vo can be reduced, the capacitance of the smoothing capacitor connected to the auxiliary-machine DC line 43 can be reduced, it is possible to attempt to reduce the size and costs of the system, and furthermore it is possible to shorten the length of time necessary for initial charging at a time of activation or discharging at a time of deactivation.

In addition, since fluctuations of the voltage Vo are reduced by using discharging of the power storage apparatus 31 in this configuration, not output of the auxiliary-machine generator 41 (i.e. output of the engine 11), but regenerative energy of the travel motors 10 is used when energy necessary for discharging is used for charging the power storage apparatus 31, and thus it is possible to enhance the energy conservation efficiency. Furthermore, if the capacity of the power storage apparatus 31 is sufficient, the power storage apparatus 31 is charged in the regeneration period, and auxiliary machines can be supplied with electric power from the power storage apparatus 31 in the non-regeneration period. Accordingly, it is possible to further enhance the energy conservation effect.

Second Embodiment

A second embodiment of the present invention is explained with reference to FIG. 14 to FIG. 17.

In the present embodiment, the auxiliary-machine generator 41 is turned on irrespective of whether or not it is the regeneration period.

Figure 14:
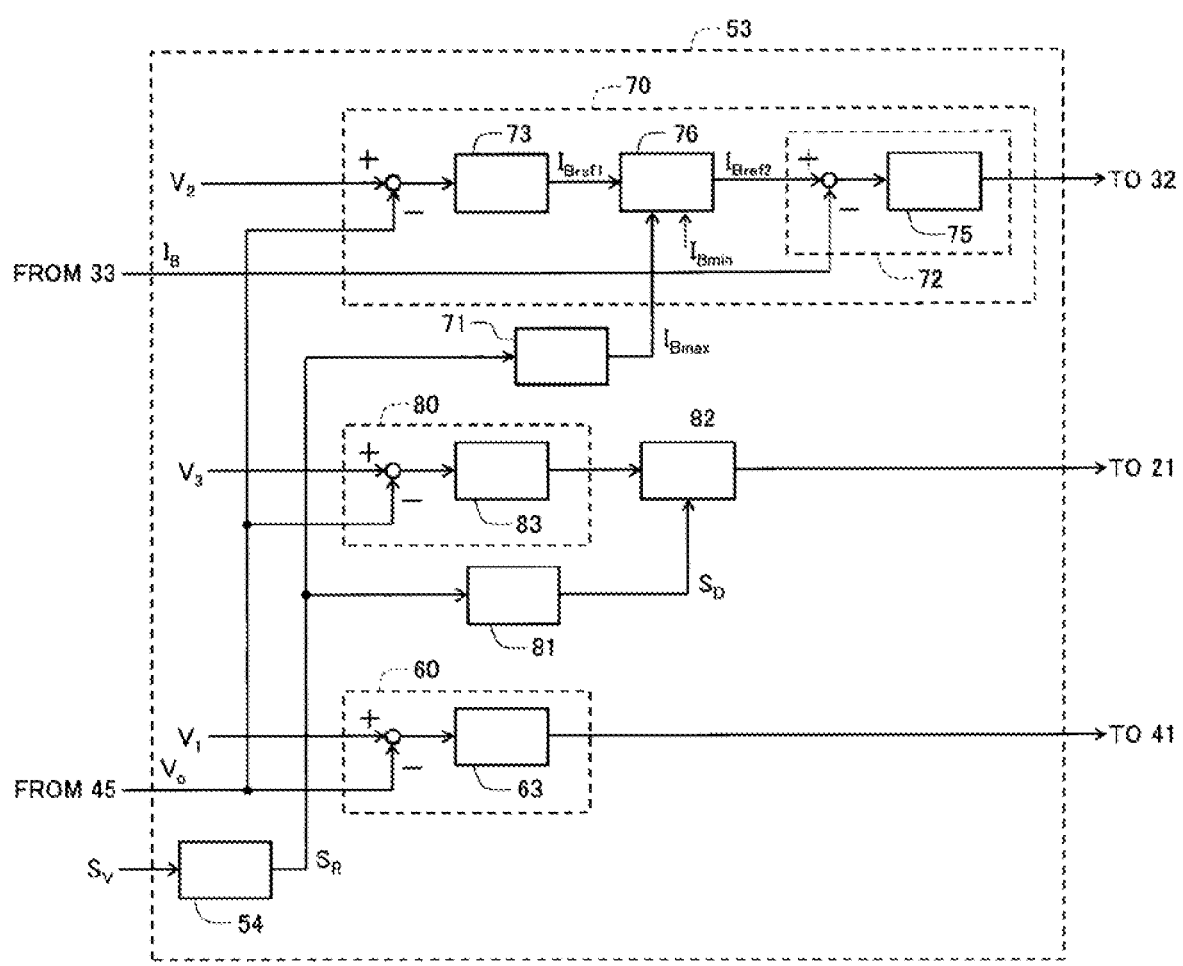
FIG. 14 is a functional block diagram depicting the processing content of the auxiliary-machine voltage control section according to a second embodiment.

FIG. 14 is a functional block diagram depicting the processing content of the auxiliary-machine voltage control section according to the present embodiment. Members in the figure that have their counterparts in the first embodiment are given the same reference characters, and explanations thereof are omitted.

In FIG. 14, the auxiliary-machine voltage control section 53 includes: the voltage control system 60 (first voltage control system), the voltage control system 70 (second voltage control system) and the voltage control system 80 (third voltage control system) for controlling the auxiliary-machine DC voltage Vo; the regeneration period determining section 54; the upper limit value setting section 71 (first upper limit value setting section); the ON/OFF switch section 81; and the ON/OFF control section 82. In the present embodiment, the first voltage command value is set to V1, the second voltage command value is set to V2, and the third voltage command value is set to V3. At this time, they are set such that V3>V2>V1 is satisfied. Note that the command values V1 to V3 are values in the tolerance range for making the auxiliary apparatus 44 operate normally.

Here, control computation of the auxiliary-machine generator 41 is explained. The auxiliary-machine voltage control section 53 does not perform ON/OFF control of the auxiliary-machine generator 41 based on a result of a determination as to whether it is the regeneration period. That is, independent of a result of a determination as to whether it is the regeneration period, an operation amount generated by the voltage control computing section 63 is output as a control signal to the auxiliary-machine generator 41.

Figure 15:
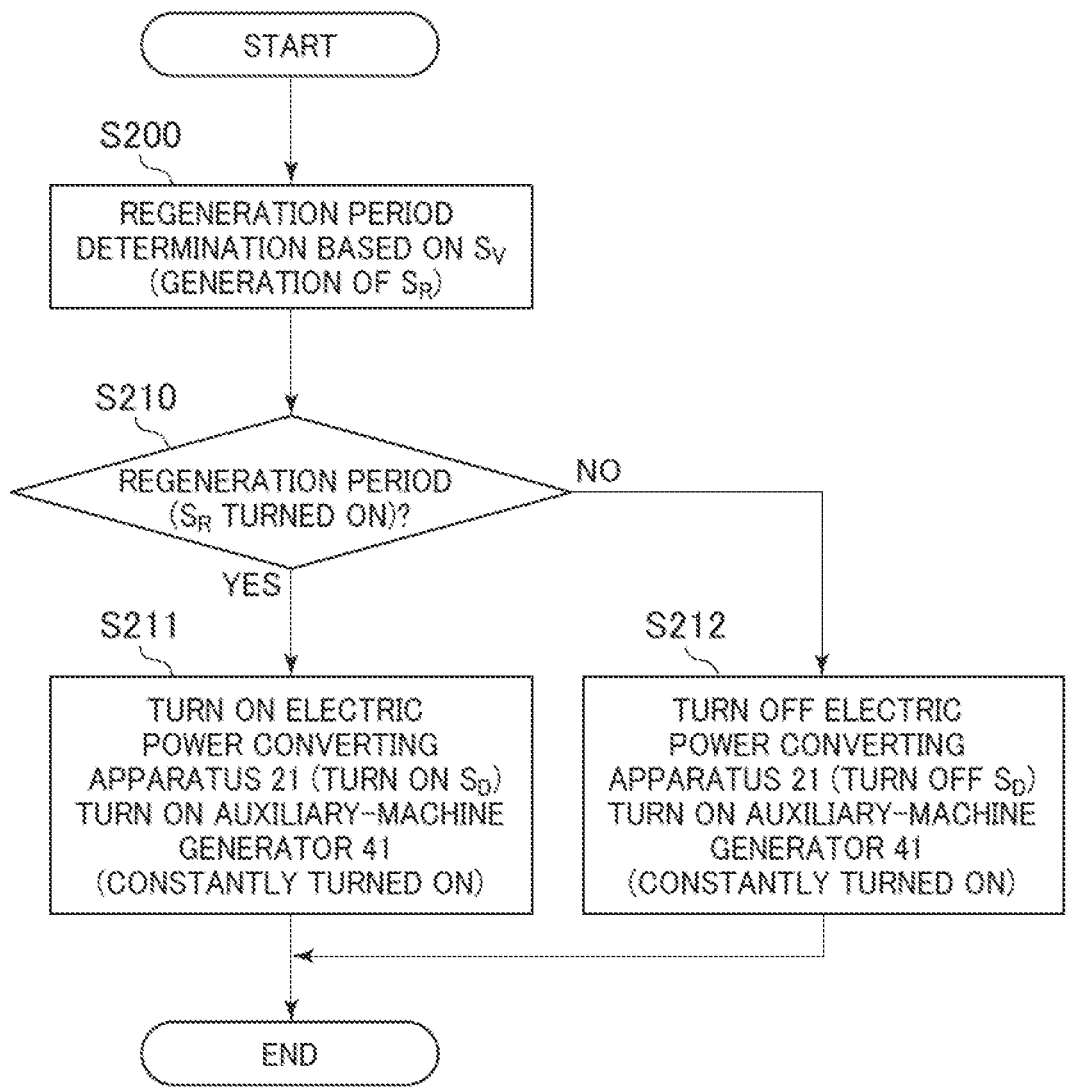
FIG. 15 is a flowchart depicting the processing content of ON/OFF switching of the electric power converting apparatus and the auxiliary-machine generator by the regeneration period determining section according to the second embodiment.

FIG. 15 is a flowchart depicting the processing content of ON/OFF switching of the electric power converting apparatus and the auxiliary-machine generator by the regeneration period determining section.

In FIG. 15, first, the regeneration period determining section 54 determines whether or not it is the regeneration period on the basis of the vehicle information signal SV, and generates the regeneration period determination signal SR according to a result of the determination (Step S200). Next, it is determined whether or not it is the regeneration period, that is, whether or not the regeneration period determination signal SR is turned on (Step S210), and, when the result of the determination is YES, H (high) is output as the ON/OFF signal SD to thereby perform control such that the electric power converting apparatus 21 is turned on (Step S211), and the process is ended. At this time, the auxiliary-machine generator 41 is constantly turned on, and is controlled by the operation amount generated by the voltage control computing section 63. In addition, when the result of the determination at Step S210 is NO, that is, it is determined that it is not the regeneration period, L (low) is output as the ON/OFF signal SD to thereby perform control such that the electric power converting apparatus 21 is turned off (Step S212), and the process is ended. In this case also, the auxiliary-machine generator 41 is constantly turned on, and is controlled by the operation amount generated by the voltage control computing section 63.

Next, control computation of the electric power converting apparatus 32 is explained. The voltage control system 70 includes the voltage control computing section 73, and the current control system 72 which is a minor loop. Operation of these is similar to that in the first embodiment, and therefore explanations thereof are omitted. The voltage control system 70 includes a variable limiter 76. The variable limiter 76 further receives input of a current lower limit value IBmin, in addition to the pre-limiter-processing current command value IBref1 and the current upper limit value IBmax. The variable limiter 76 implements limiter processing on the pre-limiter-processing current command value IBref1 using IBmax as the upper limit value and the IBmin as the lower limit value, and thereby generates the post-limiter-processing current command value IBref2. The voltage control system 70 generates an operation amount of the electric power converting apparatus 32, and outputs the operation amount as a control signal to the electric power converting apparatus 32.

Figure 16:
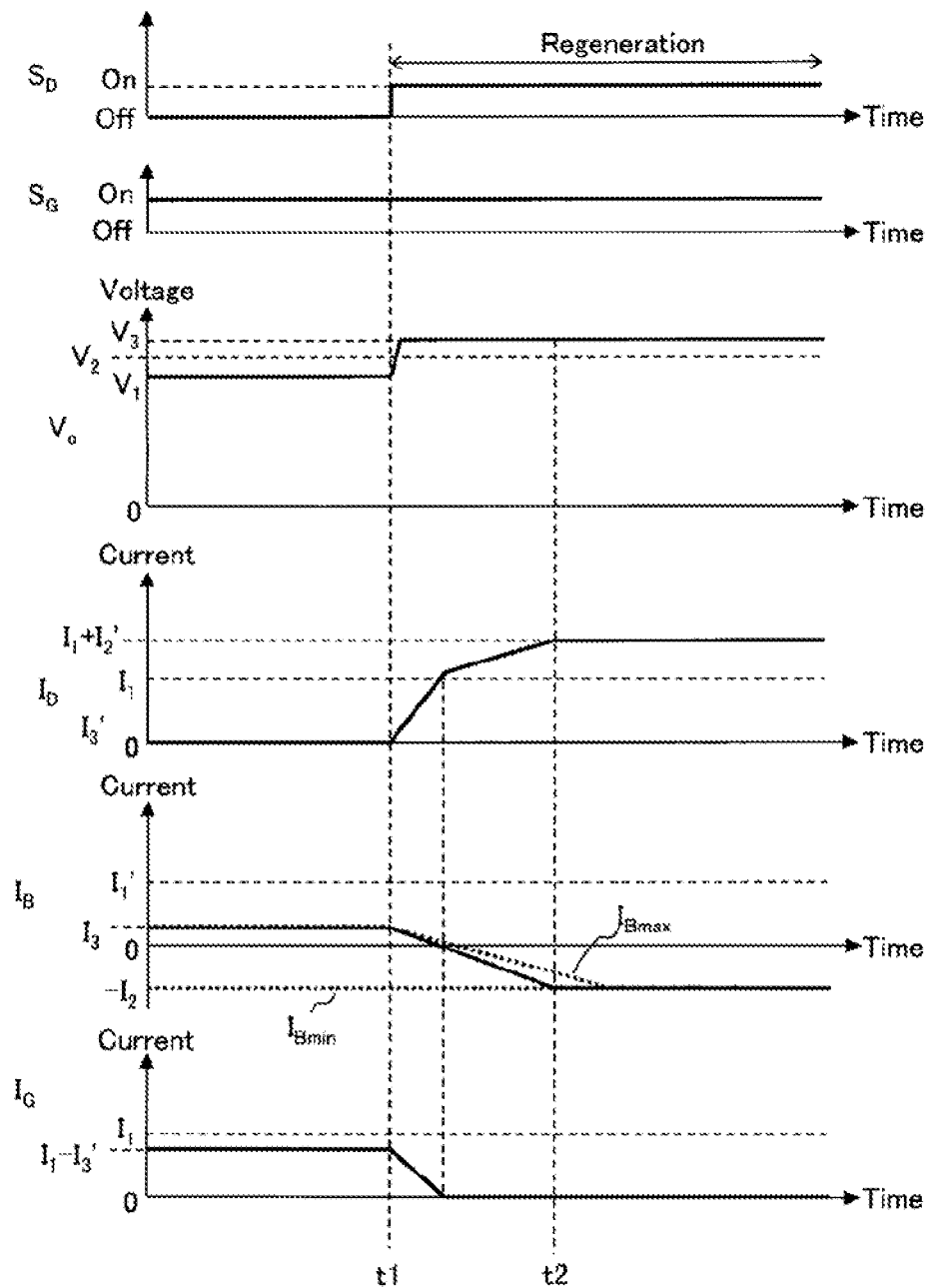
FIG. 16 is a timing chart depicting an example of operation waveforms of the electric driving system according to the second embodiment, and is a figure depicting how it appears at the start of the regeneration period.
Figure 17:
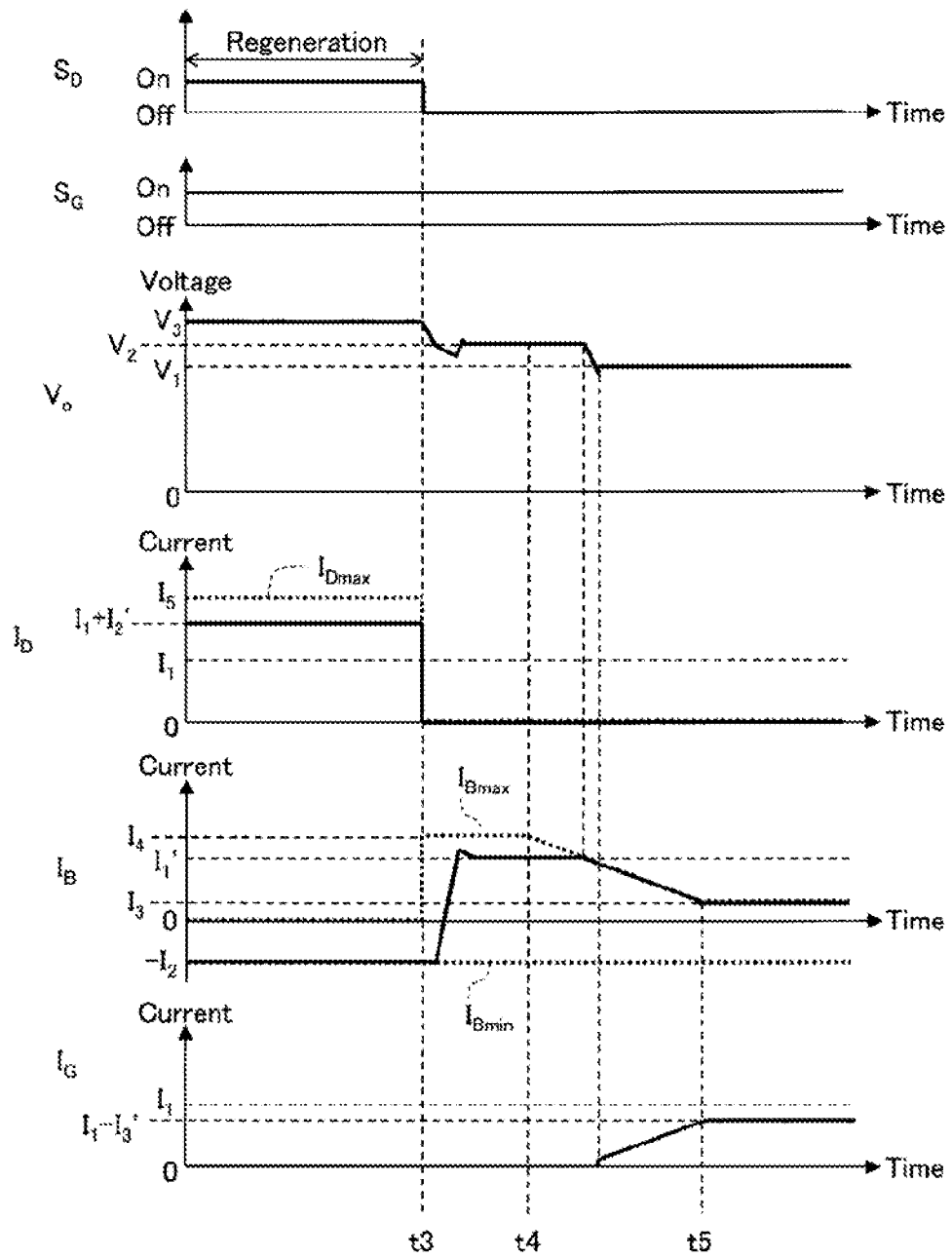
FIG. 17 is a timing chart depicting an example of operation waveforms of the electric driving system according to the second embodiment, and is a figure depicting how it appears at the end of the regeneration period.

FIG. 16 and FIG. 17 are timing charts depicting examples of operation waveform of the electric driving system, FIG. 16 depicts how it appears at the start of the regeneration period, and FIG. 17 depicts how it appears at the end of the regeneration period.

Vertical axis items in FIG. 16 and FIG. 17 are the ON/OFF signals SD and SG of the electric power converting apparatus 21 and the auxiliary-machine generator 41, the auxiliary-machine DC voltage Vo, the output current ID of the electric power converting apparatus 21, the charge/discharge current IB of the power storage apparatus 31, and the output current IG of the auxiliary-machine generator 41. The current upper limit value IBmax and lower limit value IBmin of the charge/discharge current IB of the power storage apparatus 31 are represented by dotted lines in a superimposed manner.

ON/OFF control of the auxiliary-machine generator 41 is not performed in the present embodiment. Accordingly, to compare with the first embodiment, the ON/OFF signal SG of the auxiliary-machine generator 41 is depicted as being constantly turned on. It is supposed that a current input to the auxiliary apparatus 44 is constant, and the value of the current is depicted as I1 in the figure. Note that FIG. 16 and FIG. 17 depict outlines of changes in the voltages and the currents, and depict them as linearly changing voltages or currents, but the actual voltages and currents do not necessarily change linearly.

First, operation at the start of the regeneration period is explained. Times t1 and t2 are defined as depicted in FIG. 16, and it is supposed that the regeneration period starts at time t1. Operation in the period from time t1 to time t2 and the period from time t2 is explained below in order by using FIG. 16. Note that operation in the period before time t1 is similar to that in the first embodiment (see FIG. 10), and therefore an explanation thereof is omitted. The auxiliary-machine voltage control section 53 sets a current value IBmin to (−I2) in the entire period.

In the period from time t1 to time t2, the regeneration period starts at time t1, the electric power converting apparatus 21 is turned on. The voltage control system 80 for the electric power converting apparatus 21 operates so as to increase the voltage Vo from V1 to V3, and increases the output current ID. On the other hand, if the voltage Vo becomes greater than V1, the voltage control system 60 for the auxiliary-machine generator 41 operates so as to reduce the voltage Vo to V1, and reduces the output current IG. In this manner, whereas both electric power converting apparatus 21 and the auxiliary-machine generator 41 try to control the voltage Vo, in this state, the output of electric power by the electric power converting apparatus 21 is prioritized since V3>V1. As a result, the voltage Vo is controlled by the electric power converting apparatus 21 to become V3, and the current IG decreases to 0 (zero). That is, where the auxiliary-machine generator 41 is constantly turned on also, the output of the auxiliary-machine generator 41 can be reduced.

In the period from time t1, the upper limit value setting section 71 gradually reduces the current value IBmax. On the other hand, the voltage control system 70 for the electric power converting apparatus 32 operates so as to reduce the voltage Vo to V2, and gradually reduces the current IB. As compared with a decrease in the current value IBmax, a reduction of the current IB by the voltage control system 70 is faster in the case depicted in FIG. 16. If the positive current IB turns negative, the power storage apparatus 31 that has been being discharged starts being charged. Unlike the first embodiment in which charging is started forcibly according to the current value IBmax, charging is started when V3>V2. Note that when the current IB decreases faster than IBmax, the behavior of the current IB does not change even if the decrease in IBmax is stopped in the middle (e.g. at zero) before IBmax reaches (−I2). Due to the decrease in the current IB, the current IB' also decreases along with it.

In response to the reductions of the current IG and current IB', the electric power converting apparatus 21 gradually increases the current ID such that the auxiliary-machine power supply current IA (=ID+IB'+IG) matches the current I1. Actually, the gradually decreasing current IG and current IB' become disturbances, and the voltage Vo becomes slightly lower than V3. It should be noted that FIG. 16 does not reflect this, and it is supposed that the voltage Vo matches V3.

In the period from time t2, at time t2, the current IB decreases to (−I2). In the period from time t2 also, the voltage control system 70 for the electric power converting apparatus 32 operates so as to reduce the voltage Vo to V2. However, since the variable limiter 76 prevents the current command value IBref2 from becoming smaller than IBmin=−I2, a reduction of the current IB also is limited to IBmin=−I2. As defined in the first embodiment, the current IB' becomes (−I2'). In addition, the current ID becomes I1+I2'. Except for that the voltage Vo is controlled to become V3 as described thus far, the state of each current (ID, IB', IG) is similar to that in the period from time t2 in the first embodiment (see FIG. 10).

Next, operation at the end of the regeneration period is explained. Times t3, t4, and t5 are defined as depicted in FIG. 11. It is supposed that the regeneration period ends at time t3. Operation in the period from time t3 to time t4 and the period from time t4 to time t5 is explained below in order by using FIG. 11. Note that operation in the period before time t3 is similar to that before time t2 in the first embodiment (see FIG. 10), and therefore an explanation thereof is omitted. In addition, operation in the period from time t4 to time t5 also is similar to that in the first embodiment (see FIG. 11), and therefore an explanation thereof is omitted. The auxiliary-machine voltage control section 53 sets the current value IBmin to (−I2) in the entire period.

In the period from time t3 to time t4, when the regeneration period ends at time t3, the electric power converting apparatus 21 is turned off, and the current ID decreases to 0 (zero).

The upper limit value setting section 71 changes the current value IBmax to the positive value I4. Since the current IA (=ID+IB'+IG) is small as compared with the input current I1 of the auxiliary apparatus 44 immediately after time t3, the voltage Vo decreases from V3. When the voltage Vo becomes lower than V2, the electric power converting apparatus 32 increases the current IB to a positive value, and the power storage apparatus 31 that has been being charged starts being discharged. Due to the discharging, the voltage Vo that has been decreasing starts increasing. When the current IB' increases to I1, and the electric power converting apparatus 32 starts singly supplying the auxiliary-machine electric power, the voltage Vo is controlled to become V2. Since the voltage Vo never becomes lower than V1 in FIG. 17, the current IG stays at 0 (zero). Because of this, by time t4, the voltage Vo becomes V2, the current IB becomes I1', and the current ID and the current IG become 0 (zero).

In other respects, the configuration is similar to the first embodiment.

The thus-configured present embodiment also can provide advantages similar to those in the first embodiment.

In addition, by setting the voltage command value V3 of the electric power converting apparatus 21 greater than the voltage command value V1 of the auxiliary-machine generator 41, the output of the auxiliary-machine generator 41 can be reduced by causing the electric power converting apparatus 21 to operate without deactivating the auxiliary-machine generator 41 after the start of the regeneration period. Note that similarly to the first embodiment, the auxiliary-machine power supply is switched from the auxiliary-machine generator 41 to the electric power converting apparatus 21.

In addition, since the auxiliary-machine generator 41 is not deactivated in this configuration, fluctuations of the voltage Vo can be reduced. That is, where the auxiliary-machine generator 41 is deactivated at the start of the regeneration period, a temporal difference can occur between the deactivation and the operation start of the electric power converting apparatus 21. Where the operation start of the electric power converting apparatus 21 is delayed, the auxiliary-machine DC voltage Vo decreases from V1. In view of this, since operation of the electric power converting apparatus 21 reduces the output of the auxiliary-machine generator 41 in the configuration in the present embodiment, a reduction of the voltage Vo does not occur. In this manner, by switching the auxiliary-machine power supply without deactivating the auxiliary-machine generator 41, fluctuations of the voltage Vo can be prevented.

In addition, by increasing the voltage Vo to V3 in the regeneration period, it is possible to more surely reduce a reduction of the voltage Vo after the end of the regeneration period.

Next, features according to the embodiments described above are explained.

(1) In the embodiments described above, in a regenerative braking system including: a first generator (e.g. the main-machine generator 12) and a second generator (e.g. the auxiliary-machine generator 41) connected to an engine 11; a first rectifier circuit (e.g. the main-machine rectifier circuit 14) that is connected to the first generator, rectifies output of the first generator, and outputs the output of the first generator as DC electric power to a first DC line (e.g. the main-machine DC line 16); inverters 13L and 13R connected between the first DC line and an electric motor; an electric power consuming apparatus 15 that is connected to the first DC line, and can consume electric power of the first DC line; a second rectifier circuit (e.g. the auxiliary-machine rectifier circuit 42) that is connected to the second generator, rectifies output of the second generator, and outputs the output of the second generator as DC electric power to a second DC line (e.g. the auxiliary-machine DC line 43); an auxiliary apparatus 44 connected to the second DC line; a first electric power converting apparatus 21 that converts the electric power of the first DC line, and supplies the electric power of the first DC line to the second DC line; a power storage apparatus 31; a second electric power converting apparatus 32 that selectively performs either discharging operation in which electric power of the power storage apparatus is converted to be supplied to the second DC line or charging operation in which electric power of the second DC line is converted to be supplied to the power storage apparatus; and a controller 50, the controller: determines whether or not the electric motor is performing regeneration operation on a basis of information related to a drive subject of the electric motor; when it is determined that the regeneration operation is being performed, controls the first electric power converting apparatus such that the electric power of the first DC line is supplied to the second DC line, and a voltage of the second DC line becomes a first voltage value predetermined on a basis of an operating voltage specification of the auxiliary apparatus, controls the second generator such that the second generator is deactivated and supply of electric power to the second DC line is stopped, and controls the second electric power converting apparatus such that the electric power of the second DC line is supplied to the power storage apparatus; and when it is determined that the regeneration operation is ended, controls the first electric power converting apparatus such that the supply of the electric power from the first DC line to the second DC line is stopped, controls the second generator such that the second generator is activated to start supply of electric power to the second DC line and the voltage of the second DC line becomes the first voltage value, and controls the second electric power converting apparatus such that the electric power of the power storage apparatus is supplied to the second DC line and the voltage of the second DC line becomes a second voltage value that is a voltage value predetermined on a basis of the operating voltage specification of the auxiliary apparatus, and is higher than the first voltage value.

This enables reduction of fluctuations of a voltage supplied to auxiliary machines at a time of switching of regeneration operation by travel motors.

(2) In addition, in the embodiments described above, in the regenerative braking system according to (1), the controller 50, when it is determined that the regeneration operation is ended, controls the second electric power converting apparatus 32 such that a current supplied from the power storage apparatus to the second DC line is reduced along with a lapse of time after a predetermined length of time has elapsed from a time point at which the regeneration operation is ended.

(3) In addition, in the embodiments described above, the regenerative braking system according to (1); and driving wheels 3L and 3R driven by the electric motor as travel motors 10L and 10R, the electric motor being operated with electric power output from the first generator (e.g. the main-machine generator 12) to the first DC line (e.g. the main-machine DC line 16) via the first rectifier circuit (e.g.

the main-machine rectifier circuit 14) of the regenerative braking system and also outputting regenerative power to the first DC line, are included.

<Notes>

Note that the present invention is not limited to the embodiments described above, but includes various modification examples and combinations within the scope not departing from the gist of the present invention. In addition, the present invention is not limited to those including all the constituent elements explained in the embodiments described above, but also includes those from which some of the constituent elements are eliminated. In addition, some or all of the constituent elements, functionalities, and the like described above may be realized by, for example, designing them in an integrated circuit and so on. In addition, the constituent elements, functionalities, and the like described above may be realized by software by causing a processor to interpret and execute a program that realize respective functionalities.

DESCRIPTION OF REFERENCE CHARACTERS

1: Body frame
2L, 2R: Follower wheel (front wheel)
3L, 3R: Driving wheel (rear wheel)
4: Operation room
5: Cargo bed (vessel)
5a: Pin-joining portion
6: Hoist cylinder
7: Grid box
8: Control cabinet
9: Fuel tank
10L, 10R: Travel motor
11: Engine
12: Main-machine generator
13L, 13R: Inverter
14: Rectifier circuit
15: Electric power consuming apparatus
16: Main-machine DC line
17: Voltage sensor
21: Electric power converting apparatus
41: Auxiliary-machine generator
42: Rectifier circuit
43: Auxiliary-machine DC line
44: Auxiliary apparatus
50: Controller
51: Drive control section
52: Main-machine voltage control section
53: Auxiliary-machine voltage control section
100: Electrically driven dump truck
151: Resistor
152: Switching element
153: Diode

The invention claimed is:

1. A regenerative braking system comprising:
a first generator and a second generator connected to an engine;
a first rectifier circuit that is connected to the first generator, rectifies output of the first generator, and outputs the output of the first generator as direct current electric power to a first direct current line;
an inverter connected between the first direct current line and an electric motor;
an electric power consuming apparatus that is connected to the first direct current line, and can consume electric power of the first direct current line;
a second rectifier circuit that is connected to the second generator, rectifies output of the second generator, and outputs the output of the second generator as direct current electric power to a second direct current line;
an auxiliary apparatus connected to the second direct current line;
a first electric power converting apparatus that converts the electric power of the first direct current line, and supplies the electric power of the first direct current line to the second direct current line;
a power storage apparatus;
a second electric power converting apparatus that selectively performs either discharging operation in which the power storage apparatus is discharged, and electric power is supplied to the second direct current line or charging operation in which a voltage of the second direct current line is converted into a voltage of the power storage apparatus, and the power storage apparatus is charged; and
a controller, wherein
the controller
determines whether or not the electric motor is performing regeneration operation on a basis of information related to a drive subject of the electric motor,
when it is determined that the regeneration operation is being performed,
controls the second generator such that the voltage of the second direct current line becomes a first voltage value predetermined on a basis of an operating voltage specification of the auxiliary apparatus,
controls the second electric power converting apparatus such that the voltage of the second direct current line becomes a second voltage value that is a voltage value predetermined on a basis of the operating voltage specification of the auxiliary apparatus, and is higher than the first voltage value, and
controls the first electric power converting apparatus such that the voltage of the second direct current line becomes a third voltage value that is a voltage value predetermined on a basis of the operating voltage specification of the auxiliary apparatus, and is higher than the second voltage value, and
when it is determined that the regeneration operation is ended,
deactivates the first electric power converting apparatus, and controls the second generator and the second electric power converting apparatus similarly to the case where the regeneration operation is being performed.

2. The regenerative braking system according to claim 1, wherein
the controller,
when it is determined that the regeneration operation is ended,
sets an upper limit value of a discharge current of the power storage apparatus such that, only with discharging of the power storage apparatus, the auxiliary apparatus can be driven until a predetermined length of time elapses after a time point at which the regeneration operation is ended, and
controls the second electric power converting apparatus such that the upper limit value of the discharge current of the power storage apparatus is reduced along with a lapse of time after the predetermined length of time has elapsed.

3. An electrically driven work vehicle comprising:
an engine;

the regenerative braking system according to claim 1; and
a driving wheel driven by the electric motor as a travel motor, the electric motor being operated with electric power output from the first generator to the first direct current line via the first rectifier circuit of the regenerative braking system and also outputting regenerative power to the first direct current line.

* * * * *